US008849707B2

(12) United States Patent
Heggem

(10) Patent No.: US 8,849,707 B2
(45) Date of Patent: Sep. 30, 2014

(54) BUSINESS-ORIENTED SEARCH

(76) Inventor: Richard A. Heggem, Morgan Hill, CA (US)

(*) Notice: Subject to any disclaimer, the term of this patent is extended or adjusted under 35 U.S.C. 154(b) by 564 days.

(21) Appl. No.: 11/705,971

(22) Filed: Feb. 12, 2007

(65) Prior Publication Data

US 2007/0192314 A1    Aug. 16, 2007

Related U.S. Application Data

(63) Continuation-in-part of application No. 11/340,905, filed on Jan. 27, 2006.

(51) Int. Cl.
*G06Q 30/00* (2012.01)
*G06F 17/30* (2006.01)
*G06Q 30/06* (2012.01)
*G06Q 30/02* (2012.01)

(52) U.S. Cl.
CPC .......... *G06F 17/30867* (2013.01); *G06Q 30/06* (2013.01); *G06Q 30/02* (2013.01)
USPC ........ 705/26.35; 707/723; 707/728; 707/732; 707/733; 707/769

(58) Field of Classification Search
None
See application file for complete search history.

(56) References Cited

U.S. PATENT DOCUMENTS

| | | | |
|---|---|---|---|
| 5,592,375 A | 1/1997 | Salmon et al. | |
| 5,970,492 A | 10/1999 | Nielsen | |
| 6,029,175 A | 2/2000 | Chow et al. | |
| 6,460,036 B1 | 10/2002 | Herz | |
| 6,654,749 B1 * | 11/2003 | Nashed | 707/10 |
| 6,785,671 B1 * | 8/2004 | Bailey et al. | 707/3 |
| 6,868,525 B1 * | 3/2005 | Szabo | 715/738 |
| 7,050,992 B1 * | 5/2006 | Bowman et al. | 705/26 |
| 7,113,919 B1 | 9/2006 | Norris et al. | |
| 7,124,107 B1 | 10/2006 | Pishevar et al. | |
| 7,711,743 B2 * | 5/2010 | Cavagnaro et al. | 707/769 |
| 2001/0034631 A1 | 10/2001 | Kiselik | |
| 2001/0051913 A1 | 12/2001 | Vashistha et al. | |
| 2002/0013735 A1 | 1/2002 | Arora et al. | |
| 2002/0111897 A1 | 8/2002 | Davis | |
| 2002/0165814 A1 | 11/2002 | Lee et al. | |
| 2002/0174089 A1 | 11/2002 | Tenorio | |
| 2002/0198818 A1 | 12/2002 | Scott et al. | |
| 2003/0004850 A1 | 1/2003 | Li et al. | |
| 2003/0050846 A1 * | 3/2003 | Rodon | 705/26 |

(Continued)

OTHER PUBLICATIONS

Building Research Tools with Google for Dummies. Davis, Harold. Wiley Publishing, Inc., Indianapolis, IN 2005, p. 292.*

(Continued)

*Primary Examiner* — Daniel Kinsaul

(57) ABSTRACT

A system and architecture for enhancing search results generated by an Internet search engine, so that those search results include enhanced buyer-oriented information, is disclosed. According to one aspect, a list of search results generated by an Internet search engine comprises one or more search results that are associated with one or more URLs in a set of URLs. For each such URL, seller-specific information, which may be based on and/or comprise ratings that are associated with registered selling entities that are associated with that URL, is presented in association with that URL's corresponding search result in the list of search results. A user who submitted query terms, based upon which the list of search results was generated, can use the presented rating information to determine which of the search results to investigate further.

20 Claims, 11 Drawing Sheets

(56) References Cited

U.S. PATENT DOCUMENTS

| | | |
|---|---|---|
| 2003/0074298 A1 | 4/2003 | Daum |
| 2003/0172022 A1 | 9/2003 | Coyne et al. |
| 2004/0225574 A1* | 11/2004 | Arnold et al. ............... 705/26 |
| 2005/0015330 A1* | 1/2005 | Beery et al. ................. 705/38 |
| 2005/0038688 A1* | 2/2005 | Collins et al. ................ 705/9 |
| 2005/0055306 A1 | 3/2005 | Miller et al. |
| 2005/0065811 A1* | 3/2005 | Chu et al. .................... 705/1 |
| 2005/0096955 A1 | 5/2005 | Sorensen |
| 2005/0177614 A1* | 8/2005 | Bourne ...................... 709/200 |
| 2005/0256866 A1* | 11/2005 | Lu et al. ....................... 707/5 |
| 2005/0278317 A1* | 12/2005 | Gross et al. .................. 707/3 |
| 2006/0042483 A1* | 3/2006 | Work et al. ................. 101/91 |
| 2006/0143068 A1* | 6/2006 | Calabria .................... 705/10 |
| 2006/0195428 A1* | 8/2006 | Peckover ..................... 707/3 |
| 2007/0038511 A1* | 2/2007 | Hytken ....................... 705/14 |
| 2007/0050265 A1* | 3/2007 | Konstacky .................. 705/26 |
| 2008/0059329 A1* | 3/2008 | Luchene et al. ............. 705/26 |

OTHER PUBLICATIONS

Scott2, U.S. Appl. No. 09/571,792 that was incorporated in its entirety into PGPub 2002/0198818 (para 001), now abandoned, dated May 16, 2000.

Elance, Inc., "Corporate Overview, The Better Way to Buy and Manage Services," 2000-2004, http://www.elance.com/c/static/main/displayhtml.pl?file=about.html&, data retrieved Apr. 1, 2004, pp. 1-2.

Elance, Inc., "Elance History," 2000-2004, http://www.elance.com/c/static/main/displayhtml.pl?file=heritage.html, data retrieved Apr. 1, 2004, pp. 1-2.

* cited by examiner

| Filter | Seller | Company | Product | |
|---|---|---|---|---|
| Sellers: 1-4 of 4 | | | | << Previous | 1 | Next >> |
| Sellers that PASSED my hard filters | | | | |
| 50% | Timothy James 👋(1) ↻(0) ⓣ(2) | DESIGNLOGIC INC | 👋(1) | HCI test 👋(1) Question | Invite |
| 50% | Christopher Jon 👋(2) ↻(1) ⓣ(0) | WEBMORPHS INC | NR (0) | (More than one) NR (0) Question | Invite |
| 50% | Devin Nguyen 👋(4) ↻(0) ⓣ(1) | GAMES PARADISE INC (Unverified) | 👋(4) | (More than one) 👋(2) Question | Invite |
| Sellers that FAILED my hard filters | | | | |
| 0% | Garett Jones NR (0) ↻(0) ⓣ(0) | MOON (Unverified) | NR (0) | SEO Tuning NR (0) Question | Invite |

*Fig. 2*

SEARCH

Web | B2B | Images | Video | Audio | Directory | Local | News | Shopping | More >

"web.design"    [Search]

Answers BETA Search Services    Advanced Search    Preferences

My Web

Search Results

Results 1 - 100 of about 201,000,000 for "web design" - 0.09 sec. (About this page)

Sponsor sort    Sort by your filter score (join)    Sort by rating    Sort by trusted connections (join)

12 sellers not displayed until a match is confirmed (join to match) »

Also try: web design software, web design templates, web design company    More

SPONSOR RESULTS

- Directory - Find Web Design Schools    Gain new skills  Search and request info for flash Web
  www.all-computer-schools.com    As low as $130 per page    design schools.
  ? Score: join to see  Rating: ▓▓▓▓    more >>

- Affordable Web Design Professionals
  www.printmania.com    As low as $130 per page
  ? Score: join to see  Rating: ▓▓▓▓    more >>

1  Seller displays only to members (join to match)
   ? Score: join to see  Rating: ▓▓▓▓    more >>

Your Filter Settings

Cost:             [join...] USD (max)
Seller rating:    [join...] % (min)
Company rating:   [join...] % (min)
Product rating:   [join...] % (min)
Capital offers:   ☑
Filter score :    [join...] % (min)

More filter settings (join)...

FIG. 5

| Filter | Seller | Company | Product | |
|---|---|---|---|---|
| Sellers: 1-4 of 4 | | | | << Previous | 1 | Next >> |
| Sellers that PASSED my hard filters | | | | |
| Join to see more | This seller displays only to members (join to see more) | 👍(1) 👎(0) | This seller displays only to members | 👍(1) | Join to see more |
| Join to see more | This seller displays only to members (join to see more) | 👍(2) 👎(1) | This seller displays only to members | NR (0) | Join to see more |
| 50% | Devin Nguyen | 👍(4) 👎(0) | GAMES PARADISE INC (Unverified) | 👍(2) NR (0) | (More than one) Question | Invite |
| Sellers that FAILED my hard filters | | | | |
| 0% | Garrett Jones | NR (0) 👎(0) | MOON (Unverified) | NR (0) SEO Tuong | NR (0) Question | Invite |

FIG. 6

SEARCH  Web | B2B | Images | Video | Audio | Directory | Local | News | Shopping · More »

"web design"

Answers BETA Search Service   Advanced Search   Preferences

[Search]

My Web
Search Results

Results 1 - 100 of about 201,000,000 for "web design" - 0.09 sec. (about this page)

Sponsor sort   Sort by your filter score   Sort by rating

=12 sellers not displayed until a need category is declared (declare a Need)   More Also try: web design software, web design templates, web design company

SPONSOR RESULTS

- Directory - Find Web Design Schools   Gain new skills. Search and request info for flash Web
  www.all-computer-schools.com
  design schools
  Passed   Score: ▓▓   Rating: ▓▓   Friend rated ▓▓   more >>

- Affordable Web Design Services
  www.valueweb.com   Choose from hundreds of web designs.
  Failed   Score: ▓▓   Rating: ▓▓   more >>

1= Seller displays only for some need categories (declare a Need)

Passed   Score: ▓▓   Rating: ▓▓   more >>

Your Need
- ⊞ Money
  - ⊞ I have a cash need
  - ⊞ I have a cost need
  - ⊞ I have a profit need
  - ⊞ I have a revenue need
  - ⊞ I have a budget need
  - ⊞ Other
- ⊞ People
- ⊞ Environment
- ⊞ Business (internal)
- ⊞ Business (external)
- ⊟ Other

FIG. 7

FIG. 8 commercial printing Page 1 of 3,372,681 results · Options · Advanced · SafeSearch Strict 327. Commercial Printing
Traditional offset commercial printing, Ink on paper . . . . . . Commercial Printing. Traditional offset commercial printing. Ink on paper . . .
www.aztecprinting.com/sections/section.php?s=3  1/31/2007 · Cached page
♦ Score: ▇▇▇▇  Rating: ▇▇▇▇  Friend: ♦  more...

2,611. Full Color Commercial Printing Services - Business Cards, Brochures ...
Full-service printing and copying business.
www.copycraft.com  Cached page
♦ Score: ▇▇▇▇  Rating: ▇▇▇▇  more...

89. ThePrinters - Commercial printing company - Digital & Offset Printing
Commercial printing company offers offset and digital printings services. A single source commercial ... A unique printing company . We are more than your average commercial printing company, we offer ...
www.theprinters.com  Cached page
♦ Score: ▇▇▇▇  Rating: ▇▇▇▇  more...

43. Commercial printing services, flyers, brochures, custom printing
Commercial printing services offering full service custom printing, flyers, brochures, business ... Commercial Printing Need something printed and don't know where to turn?
www.miami-printing.com/index.html · Cached page
♥ Score: ▇▇▇▇  Rating: ▇▇▇▇ Friend: ♥  more...

— Non-ranked results —

1. Commercial Printing - My1Stop
Commercial Printing - full color printing that makes a lasting impression. Full service commercial ... Got Questions? Send us your email and we'll contact you right away,.....
www.my1stop.com · Cached page
>> Invite company to display its track record 2. Commercial Printing
Offers printing services including multicolor printing, on-demand printing, bindery, digital, conventional stripping, and ElKote finishing. Includes contacts.
www.commercialprinting.com · 1/29/2007 · Cached page
>> Invite company to display its track record 3. Printing Services, commercial printing, full color printing, printing ...
A place for print buyers to submit print requests. Multiple printers bid on the jobs.
www.printlocal.com · 1/30/2007 · Cached page
>> Invite company to display its track record 4. Commercial Printing and Direct Mail Advertising Company : BABER Inc ...
Memphis, TN company providing printing and mailing services through numerous web sites.
www.baberweb.com · Cached page
>> Invite company to display its track record 5. First Research Industry Profiles: Commercial Printing
CONTENTS Industry Overview Recent Developments * Business Challenges Trends and Opportunities Executive Insight * Call Preparation Questions Financial Information
www.firstresearch.com/IndustryAnalysis/commercialprinting.asp · 1/30/2007
Cached page
>> Invite company to display its track record

FIG. 11

BUSINESS-ORIENTED SEARCH

CLAIM OF PRIORITY AND RELATED APPLICATIONS

The present application claims priority under 35 U.S.C. §120 as a continuation-in-part of U.S. patent application Ser. No. 11/340,905, which was filed on Jan. 27, 2006, which is titled "ENHANCED BUYER-ORIENTED SEARCH RESULTS," the applicant for which application is Richard A. Heggem, and which application is incorporated by reference in its entirety for all purposes as though fully and originally disclosed herein.

The present application is related to U.S. patent application Ser. No. 10/752,163, which was filed on Jan. 5, 2004, which is titled "CONNECTING BUSINESS-TO-BUSINESS BUYERS AND SELLERS," and also to U.S. patent application Ser. No. 11/153,929, which is also titled "CONNECTING BUSINESS-TO-BUSINESS BUYERS AND SELLERS," the applicant for both of which applications is Richard A. Heggem, and both of which applications are incorporated by reference in their entirety for all purposes as though fully and originally disclosed herein.

FIELD OF THE INVENTION

The present invention relates generally to search engines and, more specifically, to methods for business-oriented search.

BACKGROUND OF THE INVENTION

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Internet search engines, such as those offered to the public by such companies as Google and Yahoo!, have become a commonplace fixture in the modern world. By entering a set of query terms into an Internet search engine, one can usually obtain a vast set of search results that pertain, to some extent, to the query terms entered. Each search result typically corresponds to a page accessible via the Internet. Each search result typically takes the form of a Uniform Resource Locator (URL), or "link," accompanied by a descriptive title and a short blurb or abstract that indicates at least a part of the content of the page to which the search result corresponds. If one activates a link in one's Internet browser, the Internet browser loads the page to which the link refers.

Internet search engines can be used to find information on almost any subject and for almost any imaginable purpose. Internet search engines are commonly used for business purposes. For example, a potential buyer might be looking for a particular product or service that would be useful in furthering the buyer's business needs. A buyer who is considering the purchase of a particular product might enter, into a search interface of an Internet search engine, query terms that describe the product for which the buyer is searching.

More often than not, due in part to the sheer magnitude of pages accessible via the Internet, the quantity of search results returned by the Internet search engine will be staggering. Usually, the number of search results returned will be far too great to allow the buyer to investigate each search result returned. Not all of the search results will actually be of interest to the buyer, either. All too often, the only way that a buyer can attempt to find a truly interesting page is by reading each title and abstract for each search result and making some judgment, based exclusively on that title and abstract, about whether the search result merits further investigation.

Search results are presented in an order that is usually represented, by the Internet search engine returning the search results, as a measure of the relevance of those results in relation to the query terms entered. For obvious reasons, search results that occur toward the top of a list of search results are more likely to be investigated than search results that occur toward the bottom of such a list. Page authors, some of whom are sellers of products and services, are well aware of this fact. Consequently, page authors often take actions that are designed to elevate their pages within lists of search results returned by Internet search engines. For example, a seller might fill his page with hidden metadata that contains an abundance of words that people are known to search for most frequently, even if the content of the seller's page actually has little or nothing to do with those words. For another example, some popular Internet search engines actually sell "featured" spots that are guaranteed, to purchasers of those spots, to be displayed at the top of certain sets of search results.

As a consequence of sellers' abilities to control where a page occurs in an ordered list of search results, the order in which search results are presented to a prospective buyer has very little to do with the buyer's interests, and has almost everything to do with the sellers' interests. The fact that a particular search results occurs at the forefront of a list of search results does not tell the buyer anything about whether the seller's product or service is better than those that appear lower in the list. The position of a search result in a list of search results also tells the buyer nothing about whether the seller deals fairly with his customers. As a general rule, the orderings of lists of search results have been much more seller-oriented than buyer-oriented.

Thus, a prospective buyer, having obtained a multitude of search results from an Internet search engine, has still gained very little information in those results that will assist him in finding a high-quality seller that is likely to offer a high-quality product or service. Any qualitative information represented in the search results has a good chance of being biased or misleading, since such information originates from those whose interests often compel them to be less than perfectly honest and candid. While the search results may help a prospective buyer to locate products and services in which the buyer might be interested, the search results cannot adequately inform the buyer about which sellers the buyer can trust.

Thus, a prospective buyer's search on the Internet for a high-quality product or service offered by a high-quality seller is, in many respects, similar to a search for a needle in a haystack.

SUMMARY OF THE INVENTION

A system and architecture for enhancing search results generated by an Internet search engine, so that those search results include enhanced buyer-oriented information, is disclosed. The results may be presented in the context of a prospective buyer's own specified information (i.e., what the prospective buyer is looking for). According to one aspect, a list of search results generated by an Internet search engine comprises one or more search results that are associated with one or more URLs in a set of URLs. For each such URL, seller-specific information, which may include ratings that are associated with registered selling entities that are associated with that URL, is presented in association with that URL's corresponding search result in the list of search results. A user who submitted query terms, based upon which the list of search results was generated, can use the presented seller-specific information to determine which of the search results to investigate further.

The seller-specific information may comprise additional items of information that a prospective buyer would find beneficial. Some of these additional items of information may be customized based on a prospective buyer's specified preferences. Some of these additional items of information, which might be displayed along with search results, are described in greater detail below.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a diagram that illustrates an example of selling entity information that may be presented on a dynamically generated page, according to an embodiment of the invention;

FIG. 5 is a diagram that illustrates a portion of a search results page in which a search result has been obscured due to the searching user's lack of a registered buying entity account, according to an embodiment of the invention;

FIG. 6 is a diagram that illustrates per-selling-entity information about multiple selling entities that are associated with the same URL, according to an embodiment of the invention;

FIG. 7 is a diagram that illustrates a portion of a search results page in which a search result has been obscured due to the searching user's failure to declare at least one need category, according to an embodiment of the invention;

FIG. 8 is a diagram that illustrates per-selling-entity information about each of multiple selling entities that are associated with the same URL, according to an embodiment of the invention;

FIG. 11 is a diagram that illustrates a split screen search results page, according to an embodiment of the invention.

DETAILED DESCRIPTION OF THE INVENTION

Figure 1:
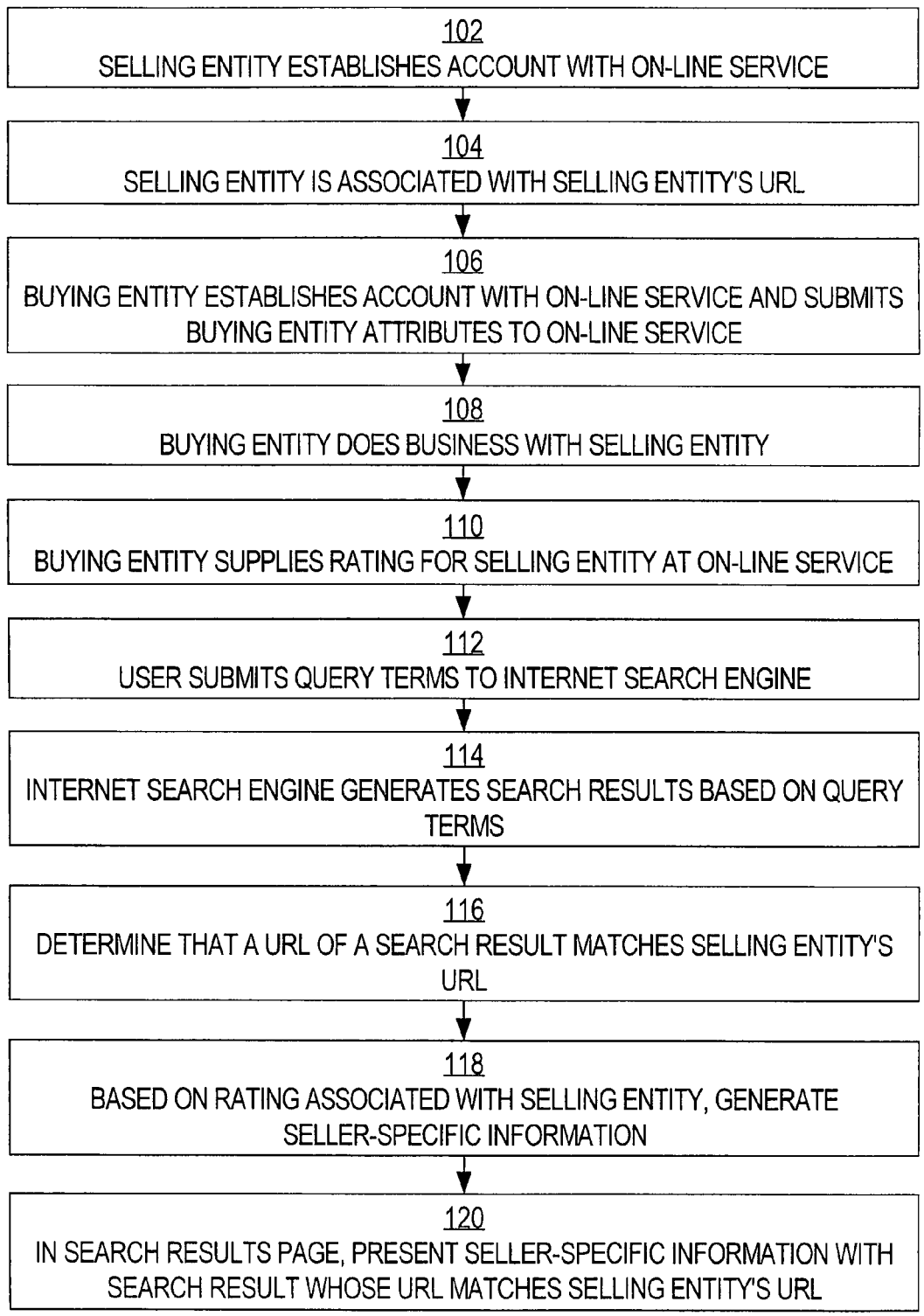
FIG. 1 is a flow diagram that depicts an example of a technique by which buying entities rate selling entities and by which seller-specific information, which may be based on and/or indicate such ratings, is displayed in connection with Internet search results, according to an embodiment of the invention.

A method and apparatus for connecting buying entities and selling entities is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. In some instances, flow diagrams are used to depict steps performed in various embodiments of the invention. The invention is not limited to the particular order of steps depicted in the figures and the order may vary, depending upon the requirements of a particular implementation. Furthermore, steps that are depicted and described may be removed and/or other steps may be added, depending upon the requirements of a particular implementation. Various aspects of the invention are described hereinafter in the following sections:

I. GENERAL OVERVIEW
II. OPERATIONAL OVERVIEW
III. ACCESSING ENHANCED BUYER-ORIENTED INFORMATION
IV. DETAILED RATING INFORMATION
V. ONGOING RELATIONSHIP RATING
VI. BUYER-SPECIFIC HARD FILTER RATING
VII. BUYER-SPECIFIC TRUSTED BUYER NETWORK INDICATOR
VIII. EXTENSIBLE DISPLAY
IX. SORTING SEARCH RESULTS
X. NARROWING THE SCOPE OF SEARCH RESULTS
XI. ENCOURAGING NEW SELLING ENTITIES TO PARTICIPATE
XII. ENCOURAGING NEW BUYING ENTITIES TO PARTICIPATE
XIII. ARCHITECTURAL EXAMPLES
XIV. RESOLVING URLS
XV. OWNERSHIP CONSIDERATIONS
XVI. BASING PER-CLICK CHARGES ON BUYING ENTITY ATTRIBUTES
XVII. OBSCURING SEARCH RESULTS FROM UNQUALIFIED BUYING ENTITIES
XVIII. ORGANIC AND SPONSORED SEARCH
XIX. SEARCH DEPTH
XX. SHOWING TEASERS TO UNREGISTERED SEARCHERS
XXI. SHOWING TEASERS ON A PER-SELLING-ENTITY BASIS
XXII. FACTORS USED TO SELECT SPONSORED SEARCH RESULTS
XXIII. CHARGING ADVERTISERS FOR BUSINESS EVENTS RATHER THAN HYPERLINK ACTIVATIONS
XXIV. BOTTOMS-UP ADVERTISING
XXV. FILTERING ON A BUYING ENTITY'S FILTER CRITERIA
XXVI. BIASING AD WORDS TOWARD ORGANIZATIONS ASSOCIATED WITH REGISTERED SELLING ENTITIES
XXVII. "FREE CLICK" PRIVILEGES FOR ORGANIZATIONS ASSOCIATED WITH REGISTERED SELLING ENTITIES
XXVIII. FILTERING SELLERS AND ADVERTISERS BASED ON EXPERIENCES WITH TRUSTED BUYER NETWORK
XXIX. PREVENTING UNAUTHORIZED SELLING ENTITIES FROM ASSOCIATING WITH A SPONSORED SEARCH RESULT'S URL
XXX. BIDDER FILTERING OF SELLER-SPECIFIC INFORMATION

XXXI. QUERY TERM-BASED BIDDER SELECTION OF SELLER-SPECIFIC INFORMATION
XXXII. BUYER PROFILE-BASED BIDDER SELECTION OF SELLER-SPECIFIC INFORMATION
XXXIII. RANKING SEARCH RESULTS
XXXIV. ORGANIC SEARCH ALGORITHM
XXXV. SHOWING TEASERS TO SEARCHERS WHO HAVE NOT DECLARED A NEED CATEGORY
XXXVI. EXAMPLE FLOWS
XXXVII. IMPLEMENTATION MECHANISMS, ALTERNATIVES & EXTENSIONS

I. General Overview

Techniques for automatically enhancing Internet search results, so that those search results include buyer-oriented, seller-specific information, are disclosed. According to one aspect, each URL in a set of one or more registered URLs is associated with a separate set of one or more registered selling entities. The selling entities may be individual people, for example. Each of the selling entities is associated with one or more ratings from one or more registered buying entities that have done business with that selling entity. The buying entities also may be individual people, for example.

According to one aspect, a list of search results generated by an Internet search engine comprises one or more search results that are associated with one or more of the URLs in the set of URLs. For each such URL, seller-specific information, which may be based on and include the ratings that are associated with the registered selling entities that are associated with that URL, is presented in association with that URL's corresponding search result in the list of search results. A user who submitted query terms, based upon which the list of search results was generated, can use the presented seller-specific information to determine which of the search results to investigate further.

For example, in a business-to-business connectivity system such as that described in U.S. patent application Ser. Nos. 11/153,929 and 10/752,163, a URL, "www.thiscompany.com," might be associated with two separate selling entities who both work for the company that owns the URL. Each of these selling entities may have a separate account within the system. Buying entities that do business with the selling entities may use the system to provide ratings relative to the selling entities. The system associates these ratings with the selling entities, as is described in U.S. patent application Ser. Nos. 11/153,929 and 10/752,163.

Continuing the example, a prospective buyer might submit, to an Internet search engine, query terms that cause the Internet search engine to generate a list of search results. The list might include a particular search result that corresponds to the "www.thiscompany.com" URL. As a consequence of the list containing the particular search result, the list may be automatically enhanced to include seller-specific information that is based on the ratings that are associated with the two selling entities that are associated with the "www.thiscompany.com" URL. The seller-specific information may be presented in proximity with the particular search result in the list of search results that is presented to the prospective buyer.

If the seller-specific information (potentially including ratings) indicates that other buying entities have had a good business experience with the selling entities associated with the particular search result's URL, then the prospective buyer will be motivated to investigate the particular search result further by activating the link that is presented with the particular search result. Alternatively, if the seller-specific information (potentially including ratings) indicates that other buying entities have had a bad business experience with the selling entities associated with the particular search result's URL, then the prospective buyer will be motivated to ignore the particular search result and investigate other search results in the list. The seller-specific information presented in conjunction with the Internet search results greatly assists potential buyers in choosing which search results to investigate further.

Because selling entities know that their chances of being investigated via Internet search engines hinge on whether buying entities give them good ratings, selling entities are more likely to treat all of their customers and clients with the utmost care. Thus, the techniques described above help to improve the whole marketplace.

According to one embodiment of the invention, people register with an on-line business-to-business connectivity service by establishing buyer accounts and/or seller accounts. Those people who establish buyer accounts are "buying entities." Those people who establish seller accounts are "selling entities." Upon establishing their accounts, buying entities and selling entities can specify, to the on-line service, attributes and characteristics that they possess in their capacities as buyers and sellers.

For example, attributes of a buying entity may include whether the entity is a decision maker, whether the entity has signing authority, characteristics of a decision process by which the entity makes business decisions, the industry in which the entity is involved, the entity's title within the entity's company, the entity's function within the entity's company, the entity's company's revenue, the number of subordinates who report to the entity, the entity's geographical location, the entity's allotted budget, etc. Attributes of a selling entity may include the entity's company name, the entity's company's revenue, the industry in which the entity is involved, one or more references who can vouch for the entity, the entity's costs, products and/or services that the entity offers, resources to which the entity has access, etc. The collection of an entity's attributes form a kind of "DNA" for that entity.

Significantly, a selling entity's attributes also include ratings that are provided by buying entities through the on-line business-to-business connectivity service. The ratings may pertain directly to the selling entity, and/or to the selling entity's company and/or the selling entity's products and/or services. These ratings are not specified by the selling entity.

A buying entity's attributes may comprise criteria that a selling entity's attributes must satisfy in order for the selling entity to qualify as a selling entity in which the buying entity might be interested. Similarly, a selling entity's attributes may comprise criteria that a buying entity's attributes must satisfy in order for the buying entity to qualify as a buying entity in which the selling entity might be interested. Buying entities and selling entities may rank and filter each other based on the extent to which they satisfy each other's criteria.

Although registered selling entities are formally associated with URLs of Internet resources (e.g., web pages) in one embodiment of the invention, in alternative embodiments of the invention, registered selling entities are additionally or alternatively associated with such Internet resources via other aspects of those Internet resources. Such other aspects may include the title, domain, and/or ownership of those Internet resources, for example. Embodiments of the invention are not limited to those in which registered selling entities are associated strictly with URLs of Internet resources.

II. Operational Overview

FIG. 1 is a flow diagram that depicts an example of a technique by which buying entities rate selling entities and by which seller-specific information, which may be based on and/or indicate such ratings, is displayed in connection with Internet search results, according to an embodiment of the invention. Additional steps, not expressly shown in FIG. 1, also may be performed in various embodiments of the invention.

In block 102, a selling entity establishes an account with an on-line business-to-business connectivity service, thereby becoming a "registered" selling entity. For example, using his Internet browser, a selling entity, such as a salesman who works for a company, may establish a seller account with a business-to-business connectivity service such as is described in U.S. patent application Ser. Nos. 11/153,929 and 10/752, 163. Such a business-to-business connectivity service is presently accessible through the URL "www.myhandshake.com."

In block 104, the selling entity supplies a URL to the on-line business-to-business connectivity service. The submitted URL refers to the selling entity's page on the Internet—the selling entity's "web site." The service establishes an association between the selling entity's account and the URL. Such an association may be stored in a "B2B" database, for example. For example, the selling entity might supply a URL such as "www.thiscompany.com," which might be the URL of a page authored by either the selling entity or a company for whom the selling entity works. As a result, the URL becomes a "registered" URL recognized by the service. According to one embodiment of the invention, multiple different selling entities may be associated with the same URL.

In block 106, a buying entity (who may be a person other than the "user" introduced below with reference to block 112) establishes an account with the on-line business-to-business connectivity service, thereby becoming a "registered" buying entity. For example, using his Internet browser, a buying entity, such as a vice president of a corporation, may establish a buyer account with the service. At the time that the buying entity establishes the account, the buying entity may be required to submit, to the service, a set of buying entity attributes that describe the buying entity. According to one embodiment of the invention, a buying entity's registration with the service enables the service to provide, to the buying entity, selling entity information that is tailored based specifically on the buying entity's specified preferences and filter criteria, as is described in greater detail below in sections VI and VII. However, if a user opts not to register with the service, this does not prevent useful, although possibly less customized, information about selling entities from being provided to the user.

In block 108, the buying entity does business with the selling entity. For example, the buying entity may choose to respond to the selling entity's on-line solicitations made to the buying entity via the service. The buying entity may decide to purchase the products and/or services offered in the selling entity's on-line solicitations.

In block 110, after having at least some interaction with the selling entity, the buying entity supplies, to the on-line business-to-business connectivity service, a rating for the selling entity. For example, the buying entity may supply the rating to the service through his Internet browser. The rating may be representative of the extent to which the buying entity is satisfied with the selling entity and/or the selling entity's company and/or the products and/or services that the buying entity purchased from the selling entity, for example. For example, the rating may be a number within a specified range of numbers (e.g., 1 to 10), or a "thumbs up/thumbs down/ thumbs sideways" indication of satisfaction or dissatisfaction. Various rating schemes are possible. The service establishes an association between the selling entity's account and the rating. Such an association may be stored in a "B2B" database, for example.

Various different buying entities may establish accounts with the on-line business-to-business connectivity service, and various different buying entities may do business with and provide ratings for the selling entity. The service may associate each such rating with the rated selling entity's account.

In block 112, a user, or "prospective buyer" (who might or might not have an account with the on-line business-to-business connectivity service, and who might be a person other than the buying entity discussed above with reference to blocks 106-110), submits one or more query terms to an Internet search engine. For example, the user might direct his Internet browser to the URL of one of the many popular Internet search engines available today, and enter one or more query terms into a search field displayed on the search engine's page.

The query terms might represent a variety of information. For example, the query terms might represent a specific product or service in which the user is interested. For another example, the query terms might represent a specific company in which the user is interested. For yet another example, the query terms might represent a problem that the user would like to have solved. Beneficially, by employing an Internet search engine to perform a search, the user can take advantage of existing associations between phrases and pages on the Internet. The user's search is not restricted to any particular category of information.

In block 114, the Internet search engine generates a set of search results based on the query terms. For example, the Internet search engine may select, from among a body of indexed pages previously discovered on the Internet, a set of pages that the search engine determines to have some relevance to the query terms. Each selected page has an associated URL through which that page can be accessed on the Internet. For each selected page, the Internet search engine may generate a search result that comprises the selected page's URL. The search result may include other descriptive information as well, such as a title and abstract of the corresponding selected page, for example. The Internet search engine may rank the selected pages using some scheme.

In block 116, for each search result in at least a subset of the search results (e.g., the top 100 search results), a determination is made as to whether that search result's associated URL is a "registered" URL that is associated with at least one selling entity's account in the on-line business-to-business connectivity service discussed above. In different embodiments of the invention, this determination may be made in different ways.

According to one embodiment of the invention, this determination is made by the Internet search engine itself before the search results are presented to the user who submitted the query terms. According to another embodiment of the invention, this determination is made by a "toolbar" application that executes on the same computer as the Internet browser of the user who submitted the query terms. In this latter embodiment, for example, the determination may be made after the user's browser has already received at least a subset of the search results from the Internet search engine. In either case, the entity that makes the determination has access to the URL-to-selling entity account associations established via the on-line business-to-business connectivity service as discussed above in block 104. As is discussed above, such associations may be stored in a "B2B" database.

In block 118, for each of the search results determined to be associated with a registered URL that is associated with at least one registered selling entity's account, seller-specific information is generated for that search result. In one embodiment of the invention, the seller-specific information generated for a particular search result is based on the ratings that are associated with the selling entities that are associated with that URL. For example, the seller-specific information may comprise a composite rating that is generated by averaging all of the ratings that are associated with all of the selling entities that are associated with the URL. Other techniques for generating seller-specific information also may be implemented. For example, rating information within the seller-specific information may be "broken down" by selling entity in cases where more that one selling entity is associated with a URL, so that the average rating for each selling entity associated with a particular URL are generated. In one embodiment of the invention, the seller-specific information is generated by the Internet search engine before search results are sent to the user's Internet browser. In another embodiment of the invention, the seller-specific information is generated by a toolbar application after search results have been sent to the user's Internet browser.

In block 120, for each of the search results for which seller-specific information was generated, that seller-specific information is presented to the user who submitted the query terms. For example, the seller-specific information may appear in close proximity to (e.g., immediately underneath) each search result in an ordered list of search results presented to the user via the user's browser. As a result, the user can see whether the selling entities associated with each search result have been rated well or poorly by the user's peers in the marketplace (registered buying entities). Thus, the user can better determine whether to further investigate each search result in the list.

In one embodiment of the invention, the seller-specific information is integrated into the page that is generated and sent to the user's Internet browser by the Internet search engine. In another embodiment of the invention, the page that is sent to the user's Internet browser does not originally contain the seller-specific information. Instead, a toolbar application executing in conjunction with the user's Internet browser (a) detects the page when the Internet browser receives the page, (b) parses and modifies the source code of the page before the Internet browser displays the page, so that the page contains the seller-specific information in the appropriate places, and then (c) causes the Internet browser to display the modified page.

In some embodiments of the invention, the seller-specific information includes information in addition to the rating information that is presented to a prospective buyer in conjunction with search results. For example, if the user who submits the query terms to the Internet search engine is a registered buying entity known to the on-line business-to-business connectivity service, additional information, which is based at least in part on preferences and criteria specified in the user's account, also may be generated and displayed along with the rating information. Some of this additional information is discussed below.

III. Accessing Enhanced Buyer-Oriented Information

As is discussed above, in one embodiment of the invention, search results displayed to a user of an Internet search engine may be enhanced with buyer-oriented information. Such buyer-oriented information may include selling entity ratings previously submitted by registered buying entities, for example.

In one embodiment of the invention, this buyer-oriented information is not initially presented within the search results page that is originally displayed to the user who submitted the query terms. Instead, in one embodiment of the invention, the search results page that is originally displayed to the user contains search results of the kind that are customarily presented by Internet search engines. However, in such an embodiment, that search results page also comprises a link, such as a link labeled "B2B," or "Business-to-Business," or "MyHandshake," which, when activated, causes the user's Internet browser to load a search results page that does contain the buyer-oriented information, such as the selling entity ratings, as described above. Thus, a user has the option of seeing search results enhanced by seller-specific information, or without such enhancements.

In one embodiment of the invention, the link which leads to the enhanced search results page is displayed at the top of the original search results page, above the list of search results. For example, the link might be included with a selection of links that typically appears at the top of each search results page. Such a selection of links might include other links such as "web," "images," "groups," "news," etc., each of which refer to more specialized search results of a particular kind, but which search results are still based on the submitted query terms.

IV. Detailed Rating Information

As is discussed above, rating information that is presented with each search result may be as simple as a single number. Such a number may be generated by averaging all of the ratings that are associated with all of the registered selling entities that are associated with a search result's corresponding URL.

However, in one embodiment of the invention, rating information is "broken down" into more refined subsets before being presented to a user. For example, in one embodiment of the invention, buying entities using the on-line business-to-business connectivity service described in U.S. patent application Ser. Nos. 11/153,929 and 10/752,163 provide separate ratings for (a) selling entities, (b) the companies for which the selling entities work, and (c) the selling entities' products and services. A buying entity might rate a selling entity favorably, but rate the selling entity's company or products unfavorably, for example. Therefore, in one embodiment of the invention, the rating information that is displayed with each search result comprises separate ratings for selling entities, the selling entities' companies, and the selling entities' products and/or services.

Additionally, as is discussed above, multiple different registered buying entities may submit different ratings for selling entities that are associated with the same URL. According to one embodiment of the invention, the different ratings provided by each separate buying entity are represented in the ratings displayed with the search results. For example, if a first buying entity gave a selling entity a "thumbs up," a second buying entity gave that selling entity a "thumbs down," and a third buying entity declined to rate the selling entity entirely, then the rating information shown in conjunction with the corresponding search result might include one "thumbs up" icon, one "thumbs down" icon, and one "NR" (for "not rated") icon. In such an embodiment, the user who views the enhanced search results can tell not only what the average rating for selling entities associated with the search result's URL is, but can also determine the precise rating supplied by each separate registered buying entity.

In one embodiment of the invention, in situations where multiple selling entities are associated with a particular search result's URL, the ratings are "broken down" into the best rating given, the average rating given, and the worst rating given to the selling entities that are associated with the particular search result's URL. In various embodiments of the invention, composite ratings may be generated using various computational techniques, and those composite ratings may be presented within seller-specific information. For example, a composite rating may be generated by multiplying together (a) a selling entity rating, (b) a company rating (of the company for which the selling entity works), and (c) a product rating (of one or more products with which the selling entity is associated). For example, if a selling entity rating is 100%, and the corresponding company and product ratings are 50% and 50%, respectively, then the composite rating for the selling entity may be produced by multiplying 100% by 50% by 50%, which is 25%. For another example, a composite rating may be generated by averaging a selling entity rating, a corresponding company rating, and a corresponding product rating. For example, if a selling entity rating is 100%, and the corresponding company and product ratings are 50% and 50%, respectively, then the composite rating for the selling entity may be produced by averaging 100%, 50%, and 50%, which is 67%.

In one embodiment of the invention, in addition to other seller-specific information, the amount of separate registered selling entities that are associated with each search result's URL are displayed in conjunction with the rest of the seller-specific information for that search result. For example, if five separate registered selling entities are all associated with the URL "www.thiscompany.com," then, next to the other seller-specific information for the search result associated with that URL, the search results page may display the fact that "5 individuals" are associated with that search result's URL.

V. Ongoing Relationship Rating

In one embodiment of the invention, along with other seller-specific information presented with a search result, a number of "ongoing relationships" associated with that search result is displayed. As is discussed above, one or more selling entities may be associated with a search result's URL. Each of these selling entities may be currently involved in one or more "ongoing relationship" phases with separate buying entities in the on-line business-to-business connectivity service.

The number of "ongoing relationships" associated with a search result is the sum of that search result's associated selling entities' "ongoing relationships." For example, if the total number of ongoing relationships in which all selling entities that are associated with the URL "www.thiscompany.com" are currently involved is 27, then, next to the other seller-specific information for the search result with that URL, the search results page may display the fact that "27 ongoing relationships" are associated with that search result. The concept of "ongoing relationships" is discussed in U.S. patent application Ser. No. 11/153,929 and is summarized below.

Buying entities and selling entities may engage in a continuing relationship with each other using the system described in U.S. patent application Ser. No. 11/153,929. Through this system-maintained relationship, buying entities and selling entities may proceed, with their mutual consent, through various phases of a multi-phase "pipeline." At each phase, buying and selling entities optionally may rate each other. In one embodiment of the invention, these phases comprise, in order, an "information-gathering" phase, a "presentation" phase, an "investigation" phase, an "implementation" phase, and an "ongoing relationship" phase.

Because the "ongoing relationship" phase is the final and potentially never-ending phase in the "pipeline," the willingness of a selling entity to work toward, reach, and continue in an "ongoing relationship" phase with a buying entity can be seen as an indication that the selling entity has a significant level of commitment to his customers. While a selling entity is in an "ongoing relationship" phase with a buying entity, that buying entity still has the opportunity to rate that selling entity. Therefore, the amount of "ongoing relationship" phases associated with a search result is information that a prospective buyer might find very useful in deciding whether to investigate that search result further.

VI. Buyer-Specific Hard Filter Results

A user does not need to be a registered buying entity in order to receive rating information and other seller-specific information that is based on input previously submitted by registered buying entities. If a buying entity opts not to register with the service, this does not prevent the service from providing, to the buying entity, useful, although possibly less customized, information about selling entities. However, according to one embodiment of the invention, when a user is a registered buying entity, the seller-specific information may additionally comprise information that is specific and tailored for the user based on preferences and criteria that are associated with the user's buying entity account.

In one embodiment of the invention, when a user registers with the on-line business-to-business connectivity service and establishes a buying entity account, the user is given the opportunity to specify, through the user's Internet browser, preferences and criteria that are stored in association with the user's account (e.g., in the "B2B" database). Some of these preferences and criteria are discussed in U.S. patent application Ser. Nos. 11/153,929 and 10/752,163.

For example, in one embodiment of the invention, a registered buying entity specifies one or more filter criteria, which are then stored in association with the buying entity's account. When a selling entity establishes a selling entity account, the selling entity may be required, in one embodiment of the invention, to indicate various characteristics of the selling entity (e.g., the geographical locations in which the selling entity does business, the selling entity's role in the company for which he works, the number of employees in the selling entity's company, the approximate annual revenues of the selling entity's company, the general industry in which the selling entity is involved, etc.). These characteristics are called "seller attributes." A selling entity's seller attributes are stored in association with that selling entity's account (e.g., in the "B2B" database).

In one embodiment of the invention, a determination of whether a particular selling entity "passes" a buying entity's specified filter criteria is made by comparing that selling entity's seller attributes with the buying entity's associated filter criteria. If the seller attributes satisfy the filter criteria, then the selling entity "passes" the filter criteria. In one embodiment of the invention, a buying entity may specify some filter criteria as "hard" filter criteria and other filter criteria as "soft" filter criteria.

Additionally, in one embodiment of the invention, when a user registers with the on-line business-to-business connectivity service and establishes a buying entity account, the service instructs the user's Internet browser to store a "cookie" that identifies the user's unique buying entity account. Consequently, an Internet search engine or toolbar application can inspect this stored cookie to identify the user's buying entity account. Alternatively, a toolbar application can require a user to identify his buying entity account to the toolbar application at the time that the toolbar application starts. Using various mechanisms, such as those mentioned above, Internet search engines and/or toolbar applications are able to identify the buying entity account of the user who submits query terms to an Internet search engine.

Because the user's buying entity account can be identified, the filter criteria associated with the buying entity account can be identified and used to generated customized seller-specific information for display with search results. For example, for each selling entity that is associated with a particular search result's URL, a determination can be automatically made (e.g., by an Internet search engine or a toolbar application) as to whether that selling entity satisfies all of the buying entity's "hard" filter criteria. Along with other seller-specific information presented with the search result, the search result page may indicate an amount of selling entities that passed all of the buying entity's "hard" filter criteria.

For example, if there are eight separate selling entities associated with the URL "www.thiscompany.com," and if only six of those selling entities pass all of the buying entity's "hard" filter criteria, then the search result associated with the URL may indicate that "six passed" the buying entity's "hard" filter criteria. This gives the buying entity some idea about whether the selling entities associated with the search result's URL are the kind of selling entities with which the buying entity typically wants to do business.

In one embodiment of the invention, the seller-specific information presented with a particular search result indicates at least two percentages: a percentage of the buying entity's filter criteria that were passed by the selling entity that passed the most of those filter criteria among selling entities associated with the search result's URL, and a percentage of the buying entity's filter criteria that were passed by the selling entity that passed the least of those filter criteria among selling entities associated with the search result's URL. These percentages are also called "filter scores." For example, if, among selling entities associated with the URL "www.thiscompany.com," the selling entity that passed the most of the buying entity's filter criteria passed 98%, and the selling entity that passed the least of the buying entity's filter criteria passed only 35%, then the seller-specific information for that URL's corresponding search result may indicate that the filter criteria passing range for selling entities associated with that URL is 35%-98%.

VII. Buyer-Specific Trusted Buyer Network Indicator

U.S. patent application Ser. No. 11/153,929 describes how a buying entity can add other registered buying entities into his "trusted buyer network." The composition of a buying entity's trusted buyer network may be maintained in a database (e.g., the "B2B" database). Essentially, a particular buying entity's trusted buyer network comprises the other registered buying entities that the buying entity has found to be reliable through experience. The opinions of buying entities in a trusted buyer network may be considered more reliable than the opinions of others.

As is described in U.S. patent application Ser. No. 11/153,929, for each registered selling entity, an on-line business-to-business connectivity service can keep track of which registered buying entities have done business with that selling entity. For example, the service can keep track of which buying entities have entered, with a particular selling entity, into any phase of the multi-phase pipeline mentioned above.

In one embodiment of the invention, if the user who submitted the query terms is a registered buying entity who has an associated trusted buyer network, then this information can be used to inform the user about whether any of the selling entities associated with a particular search result's URL has ever done business with any buying entity in the user's trusted buyer network. In one embodiment of the invention, in addition to other seller-specific information discussed above, the information displayed in conjunction with a search result indicates a number of registered buying entities in the user's trusted buyer network who have done business (according to information maintained by the on-line business-to-business connectivity service) with any of the selling entities that are associated with that search result's URL. This number is referred to herein as the "trusted buyer network indicator."

For example, in one embodiment of the invention, if a user's trusted buyer network contains five registered buying entities, and if one of these buying entities is known to have previously interacted with any selling entity associated with the URL "www.thiscompany.com," then the search result corresponding to that URL indicates that one of the buying entities in the user's trusted buyer network has interacted with such a selling entity in the past. The user may find this information useful in deciding whether to investigate the search result further. Based on this information, the user may investigate whether the trusted buying entity rated the selling entity, and how good or bad that rating was. As is discussed above, the opinions of those whom the user knows and trusts are more useful to the user than the opinions of those with whom the user has no relationship.

As with the filter result information discussed above, the trusted buyer network indicator is customized based on the data associated with the user who submitted the query terms. Thus, in one embodiment of the invention, different users may see different information associated with the same search results.

VIII. Extensible Display

The space available to display related selling entity information on a search results page may be limited. Therefore, according to one embodiment of the invention, each search result for which seller-specific information is available, as described above, additionally comprises a link to a resource on the Internet site of the on-line business-to-business connectivity service (e.g., a page on "www.myhandshake.com"). For example, the link might read, "more information." The resource to which the link refers may be an executable program that dynamically generates a page that comprises information about selling entities that are related to the search result's URL.

FIG. 2 is a diagram that illustrates an example of the selling entity information that may be presented on such a dynamically generated page. In FIG. 2, table 200 comprises a filter column 202, a seller column 204, a company column 206, and a product column 208. The rows of table 200 are divided into two main sections: rows 210, which correspond to selling entities that passed all of the user's hard filters, and row 212, which correspond to selling entities that failed to pass at least one of the user's hard filters. Information in the table is derived from a database (e.g., the "B2B" database), in which associations between selling entities and URLs are stored.

Seller column 204 indicates the identities of the seller entities that are associated with the search result's URL. In this example, seller column 204 also indicates rating information, which was previously supplied by other registered buying entities, for that selling entity. Further, in this example, seller column 204 also indicates a number of "ongoing relationship" phases in which that seller is currently involved, as described above. Additionally, in this example, seller column 204 also indicates, where applicable, a "trusted buyer network indicator."

Company column 206 indicates the identities of the companies with which each selling entity is associated. The same URL may be associated with multiple different companies. Additionally, in this example, company column 206 also indicates rating information, which was previously supplied by other registered buying entities, for that company. As is discussed above, ratings for companies may be separate from ratings for selling entities that are associated with those companies.

Product column 208 indicates the products with which each selling entity is associated. Additionally, in this example, product column 208 also indicates rating information, which was previously supplied by other registered buying entities, for that product. If there is more than one product associated with a particular selling entity, then product column 208 may indicate the words "more than one." As is discussed above, ratings for products may be separate from ratings for selling entities that are associated with those products.

In one embodiment of the invention, each row additionally comprises links that allow a user to ask a selling entity a question anonymously or extend an invitation to the selling entity through the on-line business-to-business connectivity service, as is described further in U.S. patent application Ser. Nos. 11/153,929 and 10/752,163.

In an alternative embodiment of the invention, instead of being presented on a page that is separate from the search results page, table 200 appears in a "pop-up" box in response to a user's activation of a user interface control on the search results page. Such a "pop-up" box may be implemented through code (e.g. Java code) embedded within the search results page. The "pop-up" box may be opened and closed, thereby revealing or obscuring the detailed rating information as the user desires.

In one embodiment of the invention, some or all of the rating information discussed above, and/or other seller-specific information, appears in response to the user moving his mouse pointer over a specified section of a search result. In such an embodiment of the invention, some or all of the rating information and/or other seller-specific information may disappear in response to the user removing his mouse pointer from over the specified section of the search result.

IX. Sorting Search Results

According to one embodiment of the invention, the search results page, on which the several search results returned by the Internet search engine are displayed, comprises user-selectable mechanisms through which the search results can be sorted based on certain criteria, thereby changing the order of the search results in the list of search results. These mechanisms may be implemented as selectable links or controls on the search results page, for example. The selection of these mechanisms may cause the user's Internet browser to send sorting criteria to the Internet search engine, which then sends a revised page, with sorted results, to the user's Internet browser. The Internet search engine may sort all of the search results—not just those displayed on the search results page. Thus, sorting may cause an entirely different set of search results from the list of search results to be displayed.

For example, one such sorting mechanism may cause search results to be sorted based on rating information. Search results whose URLs are associated with higher rating information may be placed closer to the top of the list than search results whose URLs are associated with lower rating information, for example.

For another example, one such sorting mechanism may cause search results to be sorted based on how many selling entities associated with each search result's URL passed all of the user's hard filters. Search results whose URLs are associated with more selling entities that passed all of the user's hard filters may be placed closer to the top of the list than search results whose URLs are associated with fewer selling entities that passed all of the user's hard filters, for example.

One sorting mechanism may cause search results to be sorted based on filter scores computed for the selling entities associated with those search results' URLs.

For yet another example, one such sorting mechanism may cause search results to be sorted based on how many registered buying entities in the user's trusted buyer network (discussed above) have previously interacted with selling entities that are associated with a search result's URL. Search results associated with larger numbers in this area may be placed closer to the top of the list than search results associated with smaller numbers in this area, for example.

X. Narrowing the Scope of Search Results

According to one embodiment of the invention, the search results page comprises user-selectable mechanisms through which a user can narrow the scope of the search results based on specified criteria, thereby reducing the quantity of search results by "filtering out" search results that do not satisfy the specified criteria. The selection of these mechanisms may cause the user's Internet browser to send filtering criteria to the Internet search engine, which then sends a revised page, with filtered and narrowed results, to the user's Internet browser.

For example, using one such filtering mechanism, a user may cause all search results corresponding to URLs that are not associated with any registered selling entities to be excluded from the search results page. The use of this mechanism causes only those search results for which seller-specific information (e.g., rating information from registered buying entities) is available to be displayed on the search results page.

For another example, using one such filtering mechanism, a user may cause only the search result associated with a URL that is associated with the highest rating information to be displayed on the search results page.

For another example, using one such filtering mechanism, a user may cause all search results corresponding to URLs that are not associated with any registered selling entity that passes all of the user's hard filters to be excluded from the search results page. The use of this mechanism causes only those search results that are associated with a URL that is associated with at least one selling entity that passed all of the user's hard filters to be displayed on the search results page.

For another example, using one such filtering mechanism, a user may cause only the search results that are associated with a filter score (discussed above) that is above a specified threshold (e.g., 75%) to be displayed on the search results page. In one embodiment of the invention, the search engine or other mechanism that displays seller-specific information for a search result filters the selling entities that are associated with that search result's URL based on both (a) filter criteria that are associated with a buying entity that submitted the search query terms and (b) the selling entity-specified seller attributes of those selling entities. Based on such data, the search engine or other mechanism may determine a separate filter score for each selling entity that is associated with a particular search result's URL, and then present seller-specific information only for those of the selling entities whose filter scores meet or exceed a specified threshold (e.g., 90% of the buying entity's filter criteria satisfied). By displaying seller-specific information for only those selling entities that are good matches for the searching user/buying entity, the company with which those selling entities are affiliated is made to look better than if seller-specific information for all of the company's affiliates selling entities were displayed. In one embodiment of the invention, the specified threshold is specified by each selling entity, so that selling entities may opt to be omitted from search results that are presented to buying entities whose filter criteria suggest that those selling entities would not be good matches for those buying entities. Thus, in one embodiment of the invention, information about selected individual selling entities may be additionally or alternatively filtered from information that is presented to a searching user/buying entity.

For another example, using one such filtering mechanism, a user may cause only the search results that are associated with at least one trusted buyer network connection to be displayed on the search results page. The use of this mechanism causes only search results that are associated with a URL that is associated with at least one selling entity that has previously interacted with a registered buying entity in the user's trusted buyer network to be displayed on the search results page. Thus, by using such a mechanism, the list of search results can be narrowed, generally, to those that are known by registered buying entities whose opinions the user trusts.

The above discussion is not meant to present a completely exhaustive list of ways in which search results can be filtered. Search results can be filtered based on any conceivable criteria, such as the number of ongoing relationships associated with those search results, etc.

XI. Encouraging New Selling Entities to Participate

As is described above, seller-specific information that is associated with selling entities that are associated with search results' corresponding URLs may be presented next to those search results within a search results page. However, in order for such seller-specific information to be available, in one embodiment of the invention, selling entities need to register with the on-line business-to-business connectivity service by establishing an account as discussed above. After a registered selling entity has been associated with a URL and received a rating from a registered buying entity, then that rating can be used to generate at least a portion of the seller-specific information for search results that are associated with that URL.

In one embodiment of the invention, mechanisms are provided which allow a user of an Internet search engine to encourage selling entities to register with the on-line business-to-business connectivity service as selling entities. In one embodiment of the invention, for each search result on a search results page, if that search result's URL is not associated with any registered selling entities, an "invitation" link is displayed in close proximity to that search result. The text of the "invitation" link might read, "invite company to display their track record," for example.

In one embodiment of the invention, when the user activates such a link, the user's Internet browser is redirected to a "contact us" page on the "web site" of the company that is associated with the search result's URL. Such a page may be registered with the Internet search engine, for example. This page may comprise a form with fields through which a user can submit, to the company, an invitation for the company's employees to join and register with the on-line business-to-business connectivity service (e.g., "www.myhandshake.com") as selling entities.

In one embodiment of the invention, an application executing in conjunction with the user's Internet browser causes recognized fields of such a form to be populated automatically with text that gives the company's employees instructions on how to join. In another embodiment of the invention, the selection of the "invitation" link causes a text box to open (e.g., within another instance of the Internet browser). The text box contains recommended text that the user can cut and paste into the fields of the company's form in order to encourage the company's employees to register with the on-line business-to-business connectivity service as selling entities.

In an alternative embodiment of the invention, when the user activates an "invitation" link, an e-mail client program, such as Microsoft Outlook, is automatically invoked on the user's computer. The e-mail client program may be invoked by embedded code (e.g., Java code) that is associated with the "invitation" link, for example. A new e-mail message may be opened. The body of the new e-mail message may be automatically populated with service registration instructions as discussed above. The "to" address of the new e-mail message also may be automatically populated with e-mail addresses that are associated with the search result's URL. Such e-mail addresses may be automatically discovered by a program that automatically searches all of the pages at the search result's URL for any information that is indicative of an e-mail address (e.g., "mailto:" tags). The user can edit aspects of the new e-mail message prior to sending the e-mail message to the specified e-mail addresses.

In one embodiment of the invention, service registration information is not immediately sent to anyone in response to the activation of an "invitation" link. Instead, in one embodiment of the invention, the activation of the "invitation" link causes a count, associated with the appropriate search result's URL, to be incremented within a database (e.g., the "B2B" database). When the count reaches a specified threshold, a computer program executing on a machine (e.g., a machine owned by the on-line business-to-business connectivity service) automatically generates an e-mail message of the kind described above and sends the e-mail message to known or automatically discovered e-mail addresses as described above. In one embodiment of the invention, such an e-mail message is automatically generated and sent on a periodic basis (e.g., weekly or monthly).

In one embodiment of the invention, the e-mail message that is automatically generated and sent, as described above, comprises a link that identifies (to the on-line business-to-business connectivity service if not the message recipient) a buyer entity account of the user who submitted the query terms. The e-mail message may invite the e-mail message recipient to click on the link in order to be directed to a page on the connectivity service's "web site" (e.g., "www.myhandshake.com"). This page comprises mechanisms that allow the e-mail message recipient to register with the connectivity service and enter the first stage of the multi-stage pipeline (discussed above) with the user.

XII. Encouraging New Buying Entities to Participate

When a buying entity registers with the on-line business-to-business connectivity service, it allows the seller-specific information presented with the search results to be tailored and customized based on preferences and criteria associated with the buying entity's account. Therefore, in one embodiment of the invention, if the search engine or toolbar application cannot determine that the user to whom the search results are going to be presented has an account with the service (e.g., because there is no appropriate "cookie" stored on the user's computer and the user did not sign in), then the search results page is modified to include one or more invitations for the user to register with the service. In various embodiments of the invention, the modification discussed below may be performed either by the search engine, when the search engine dynamically generates the search results page, or by the toolbar application, when the toolbar application intercepts a search results page.

In one embodiment of the invention, the search results page is modified to include a link that says, "sort by your filter score (join)." In one embodiment of the invention, the search results page is modified to include a link that says, "sort by trusted connections (join)." These links are intended to give the user a preview of customized sorting features to which he would have access if he established an account with the on-line business-to-business connectivity service. In one embodiment of the invention, when the user activates one of these links, the user's browser is directed to a page on the "web site" of the on-line business-to-business connectivity service. The page instructs the user on how to establish an account, and initiates the process by which the user establishes an account.

In one embodiment of the invention, the search results page is modified to include, with each search result for which associated seller-specific information is available, a link that says "join for filter score info." Thus, the links entice the user to join the service in order to obtain filter score information that is customized based on the user's specified preferences and filter criteria. When the user activates one of these links, the user's browser is directed to the account establishment page of the on-line business-to-business connectivity service.

XIII. Architectural Examples

In one embodiment of the invention, the enhanced buyer-oriented information discussed above, such as rating information, is inserted into the code of the search results page by the Internet search engine at the time that the Internet search engine generates the search results page. The Internet search engine then sends the search results page, complete with the enhanced buyer-oriented information, to the user's Internet browser. In such an embodiment of the invention, the Internet search engine has access to the selling entity information. For example, the Internet search engine may obtain the selling entity rating information, as well as mappings between selling entities and URLs, from a "B2B" database that is populated by users of the on-line business-to-business connectivity service.

However, in some embodiments of the invention, the Internet search engine might not have access to such a "B2B" database or any of the selling entity rating information or selling entity-to-URL mapping information that would be stored therein. In some embodiments of the invention, the Internet search engine might not even be "aware" of such information at all. In some embodiments of the invention, the Internet search engine sends, to a user's Internet browser, a regular, un-enhanced search results page of the kind currently returned by popular Internet search engines such as those offered by Google and Yahoo!

In embodiments of the invention in which the Internet search engine sends a regular, un-enhanced search results page toward a user's Internet browser, the enhanced buyer-oriented information may be added to the search results page at the user's computer by a toolbar application that executes in conjunction with the user's Internet browser. The toolbar application is capable of accessing the information in a "B2B" database that is remote from the user's computer. For example, the toolbar application may access such information via the Internet.

In one embodiment of the invention, whenever a page is received by the Internet browser application, the toolbar application parses the page to determine whether the page contains search results from an Internet search engine. There are various ways in which the toolbar might make such a determination. For example, the toolbar application might determine whether the URL from which the page came is associated with a recognized Internet search engine.

If the toolbar application determines that the page contains search results from an Internet search engine, then, before the Internet browser displays the page, the toolbar application modifies the code of the page, inserting, at appropriate places within the page, available enhanced buyer-oriented information, such as rating information. For example, if the toolbar application determines that one of the search results on the original page is associated with the URL "www.thiscompany.com," then the toolbar application may query the remote "B2B" database via the Internet in order to determine whether any selling entities are associated with the URL "www.thiscompany.com."

If the toolbar application determines that there is at least one selling entity associated with that URL, then the toolbar application may retrieve, from the remote "B2B" database, seller-specific information that is associated with that selling entity and any other selling entities associated with the URL. The toolbar application may insert, into the code of the search results page at which the corresponding search result occurs, seller-specific information that the toolbar application retrieved from the "B2B" database. After the toolbar application has modified the code of the page in this manner for each search result for which enhanced buyer-oriented information is available, the toolbar application may cause the Internet browser, with which the toolbar application is at least partially integrated, to display the modified search results page.

As is discussed above, some of the enhanced buyer-oriented information that is displayed in conjunction with a search result may depend on attributes or characteristics that are associated with the user's buying entity account on the on-line business-to-business connectivity service. For example, the number of selling entities that passed a user's hard filters depends on what those hard filters are. According to one embodiment of the invention, the toolbar application accesses information associated with the user's buying entity account on the remote "B2B" database. The toolbar application uses this information in order to customize at least some of the enhanced buyer-oriented information based on the user's specified attributes, characteristics, preferences, and settings.

In one embodiment of the invention, the toolbar application provides a "sign-in" mechanism through which the user supplies the identity of his buying entity account. The toolbar application may use this identity to locate the appropriate information in the remote "B2B" database, which may be hosted by the on-line business-to-business connectivity service. In an alternative embodiment of the invention, the toolbar application identifies the user's buyer entity account by reading a "cookie" that is stored on the user's computer when the user establishes the buyer entity account with the on-line connectivity service.

In yet another alternative embodiment of the invention, a page provided by the Internet search engine—such as the page on which the user enters the query terms, for example—comprises a form with "sign-in" fields through which the user can supply his buyer entity account identity and an associated password. The Internet search engine may use the buyer entity account identity to retrieve information from the user's buyer entity account and generate customized enhanced information for display with search results.

According to one embodiment of the invention, a user can select options through menus provided by the toolbar application. For example, in one embodiment of the invention, a user can select, in such menus, criteria by which search results should be sorted and/or criteria by which search results should be filtered. Consequently, these options do not need to be indicated on or accessed via the search results page itself—although, in one embodiment of the invention, these options can be indicated on and accessed via the search results page. The toolbar application can intercept a search results page sent from an Internet search engine and parse and modify the code of the search results page so that search results are filtered and/or sorted according to the user's indicated wishes.

In one embodiment of the invention, a toolbar application as described above can be downloaded via the Internet. When the toolbar application is installed, the installation program automatically integrates the toolbar application into the user's Internet browser application so that the toolbar application and the Internet browser application can communicate with each other.

XIV. Resolving URLS

As is discussed above, selling entities may be associated with URLs in a "B2B" database. Typically, a selling entity would supply a URL with which that selling entity should be associated at the time that the selling entity initially establishes an account with the on-line business-to-business connectivity service. These URLs can be matched automatically with the URLs in a search results page in order to provide enhanced buyer-oriented information that corresponds to the selling entities that are associated with the matching URLs.

However, sometimes at least one URL in a search results page will not exactly match a URL associated with a selling entity even though the URL in the search results page actually does correspond to the URL associated with the selling entity. For example, a selling entity might be associated with the URL "www.thiscompany.com" (because that is the URL that the selling entity supplied at registration), but a search result might comprise the URL "www.thiscompany.com/topdirectory/middledirectory/bottomdirectory/file.html." Under these circumstances, seller-specific information associated with the selling entity should be displayed with the search result, even though the two URLs are not exactly the same.

Therefore, in one embodiment of the invention, registered URLs in the "B2B" database are matched with URLs in a search results page in the following manner. First, it is determined whether there is an exact match between the URL in the search results page and any of the registered URLs in the "B2B" database. If there are no exact matches, then it is determined whether there is a match between the domain name of the URL (i.e., the portion of the URL that comes before the first "/") in the search results page and any of the registered URLs in the "B2B" database.

For example, if the URL associated with a particular search result is "www.thiscompany.com/topdirectory/middledirectory/bottomdirectory/file.html," then it is determined, first, whether there is any registered URL that is exactly the same. If there is a registered URL that is exactly the same, then ratings associated with registered selling entities associated with that URL are used to generate the enhanced buyer-oriented information to be displayed with the particular search result. Alternatively, if there is no registered URL that is exactly the same, then it is determined whether there is any registered URL that is the same as "www.thiscompany.com" (the domain name of the URL in the particular search result). If there is a registered URL that is the same as "www.thiscompany.com," then ratings associated with registered selling entities associated with that URL are used to generate the enhanced buyer-oriented information to be displayed with the particular search result. Otherwise, it is determined that there is not yet any enhanced buyer-oriented information that can be displayed with the particular search result.

XV. Ownership Considerations

In one embodiment of the invention, the company that owns the Internet search engine also owns, or is in a joint venture with another company that owns, a "B2B" database that stores all of the selling entity information and buying entity information described above. In such an embodiment, the Internet search engine may insert all of the enhanced buyer-oriented information into the search results page as the search results page is generated.

In another embodiment of the invention, the company that owns the Internet search engine has no business relationship with the company that owns the "B2B" database. In such an embodiment, a toolbar application can be used to intercept and automatically enhance search result pages from Internet search engines before those search result pages are displayed in an Internet browser, as is discussed above. The toolbar application may be designed to be compatible with search result pages from multiple different Internet search engines.

XVI. Basing Per-Click Charges on Buying Entity Attributes

As is discussed above in the Overview, selling entities may specify criteria that a buying entity must satisfy in order to qualify as a buying entity in which that selling entity is interested. In one embodiment of the invention, when a registered buying entity activates a link corresponding to a particular search result within a search results page (e.g., by clicking on the particular link with his mouse), a determination is made as to the extent to which that buying entity's attributes satisfy the criteria of a selling entity that is associated with the URL of the particular search result. In one embodiment of the invention, the amount of money that the Internet search engine company charges the selling entity in response to the activation of the link is based on the extent to which the buying entity's attributes satisfy the selling entity's criteria.

For example, if the buying entity is exactly the kind of buying entity that the selling entity wants to lead to its page, as evidenced by the buying entity's attributes satisfying all or nearly all of the selling entity's specified criteria, then the Internet search engine company may charge the selling entity a relatively high fee in response to the buying entity activating a link that corresponds to the selling entity. Alternatively, if the buying entity is not even close to being the kind of buying entity that the selling entity wants to lead to its page, as evidenced by the buying entity's attributes satisfying none or nearly none of the selling entity's specified criteria, then the Internet search engine company may charge the selling entity a relatively low fee in response to the buying entity activating a link that corresponds to the selling entity. The selling entity may be charged a percentage of the full fee, where the percentage is based on the percentage of the selling entity's criteria that the buying entity's attributes satisfy.

Thus, a selling entity might be charged more when the CEO of a Fortune 500 company clicks on the selling entity's corresponding link in the search results than when an unemployed teenager clicks on that link (assuming that the selling entity's criteria indicate that the selling entity is more interested in CEOs of Fortune 500 companies than in unemployed teenagers).

XVII. Obscuring Search Results from Unqualified Buying Entities

According to one embodiment of the invention, if the user to whom a search results page is going to be presented is a registered buying entity, and if the user's buying entity attributes do not satisfy a particular selling entity's criteria, as specified in the particular selling entity's attributes, then search results that are associated with a URL that is associated with the particular selling entity are omitted or removed from the search results page before the search results page is presented to the user. An Internet search engine or a toolbar application may omit or remove the search results, for example. Thus, a buying entity known to not satisfy a selling entity's criteria is not shown the search result with whose URL the selling entity is associated.

By preventing certain search results from being seen by unqualified buying entities, the selling entity is spared the burden of dealing with a buying entity in which the selling entity is clearly not interested. The selling entity also avoids potentially paying a fee for "clicks" by unqualified and uninteresting buying entities. This technique also spares the buying entity from attempting to deal with a selling entity which is likely to be disinterested in doing business with the buying entity. Thus, both buying entities and selling entities benefit from this technique.

Figure 4:
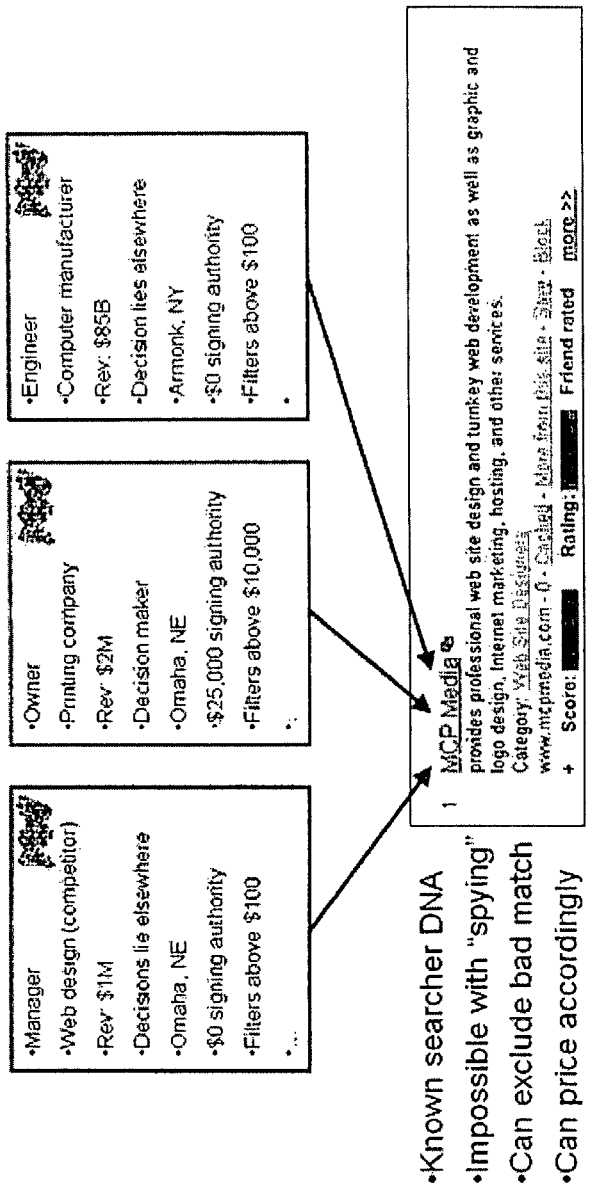
FIG. 4 is a diagram that illustrates a search result and the sets of attributes of several buying entities in whom a selling entity associated with the search result's URL may or may not be interested, according to an embodiment of the invention.

FIG. 4 is a diagram that illustrates a search result and the sets of attributes of several buying entities in whom a selling entity associated with the search result's URL may or may not be interested, according to an embodiment of the invention. Each buying entity's set of attributes represents a sort of "DNA" of that that buying entity. As shown in the figure, a first buying entity's "DNA" reveals that the first buying entity is a manager who does business in Omaha, Nebr., among other attributes. A second buying entity's "DNA" reveals that the second buying entity is an owner who also does business in Omaha, Nebr., among other attributes. A third buying entity's DNA reveals that the third buying entity is an engineer who does business in Armonk, N.Y.

Assuming that the selling entity associated with the URL for the illustrated search result is associated with criteria that indicate that the selling entity is only interested in buying entities who are both (a) owners and (b) in Omaha, Nebr., the first and third buying entity are not of interest to the selling entity, but the second buying entity is. Therefore, in one embodiment of the invention, the illustrated search result may be omitted or removed from a search results page that is going to be presented to the first buyer or the third buyer before the search results page is presented to the first buyer or the third buyer.

XVIII. Organic and Sponsored Search

A greater understanding of various embodiments of the invention described herein may be derived by first obtaining an understanding of the difference between "organic search" and "sponsored search." As used herein, "organic search" (also called "natural search") refers to a search engine's process of receiving a set of query terms, determining search results based on those query terms, and presenting those search results in an order that is based primarily or exclusively on the extent to which each of those search results is relevant to the received query terms. Search results that are determined and presented via organic search are not determined or presented based on any amount of money or other consideration paid by any party in order to obtain a favorable (e.g., more prominently presented) search result position on a search results page.

In contrast to organic search, "sponsored search" refers to a search engine's process of receiving a set of query terms, determining search results based on those query terms, and presenting those search results in an order that is based, at least to some extent, on an amount of money or other consideration paid by a party in order to obtain a favorable (e.g., more prominently presented) search result position on a search results page. Often, a search results page will contain both sponsored search results and organic search results. The sponsored search results typically are presented at a position such that they will be read before any of the organic search results are read. The sponsored search results' prominent positions in the search results page are purchased by interested parties (e.g., the owners of the web sites to which the sponsored search results correspond). Despite the sponsored search results' more prominent positions in a search results page, sponsored search results actually might have less relevance to the received query terms than some or all of the organic search results that are presented on the same search results page. Usually, but not always, sponsored search results are presented in a manner that visually distinguishes those sponsored search results from organic search results (e.g., via highlighting). Sponsored search results are often presented above or to the right of organic search results in a search results page.

XIX. Search Depth

A user performing a search for Internet-accessible resources via a search engine usually will be concerned about several aspects of the search engine. First, the user usually will be concerned about the speed at which the search results are obtained. This speed may be measured by the amount of time that passes between the user's submission of the search query terms and the user's receipt of the first page of search results. The user typically will want this amount of time to be minimal. Even the passage of a few milliseconds may be significant.

Second, the user will want the first set of search results that he sees to be useful. The user typically will not want to spend time hunting for useful search results.

Third, the user usually will want to be able to perform a search without being required to submit much information or to perform much initial configuration. The user will want to be able to use the search engine, for the first time, without needing to provide much information beyond the search query terms. If a search engine requires too much effort on the user's part prior to performing a search, the user might abandon the search engine in favor of other search engines that are less demanding of the user.

In one embodiment of the invention, these user concerns are taken into consideration in deciding whether to devote time and processing power to generating and presenting seller-specific information with certain search results. As is discussed above in connection with blocks 116, 118 and 120 of FIG. 1, in one embodiment of the invention, for each search result that is determined to be associated with a registered URL that is associated with at least one registered selling entity's account, seller-specific information (of a kind that was not contained in search results pages returned by prior Internet search engines) is generated for and presented in connection with that search result. However, in alternative embodiments of the invention, seller-specific information might not be generated or presented for certain less relevant (e.g., lower-ranked) search results under certain conditions, even if those certain search results are associated with at least one registered selling entity's account. By avoiding the generation and presentation of seller-specific information for one or more less relevant search results, search results may be generated and presented to the user more quickly.

In the discussion below, search results that are associated with a URL (or, in one embodiment of the invention, some other search result attribute) that is associated with at least one registered selling entity are referred to as "enhanceable search results"

In one embodiment of the invention, after the search engine has determined a set of relevant search results based on the search query terms, and after the search engine has ranked those search results by relevance, the search engine determines, for only a top "N" percent (where N is some specified number) of the relevant search results, whether those search results are enhanceable search results. In such an embodiment of the invention, the search engine generates seller-specific information (e.g., buying entity-submitted ratings) only for enhanceable search results that are in the top N percent of the ranked search results. For example, in one embodiment of the invention, the search engine generates and presents seller-specific information only for enhanceable search results that are in the top 50% of the ranked search results. In such an embodiment of the invention, the search engine does not generate or present seller-specific information for any search result whose ranking puts that search result beneath the top 50% of the ranked search results.

In one embodiment of the invention, after the search engine has determined a set of relevant search results based on the search query terms, and after the search engine has ranked those search results by relevance, the search engine determines, for only a top "N" (where N is some specified number) of the relevant search results, whether those search results are enhanceable search results. In such an embodiment of the invention, the search engine generates seller-specific information only for enhanceable search results that are in the top N of the ranked search results. For example, in one embodiment of the invention, the search engine generates and presents seller-specific information only for enhanceable search results that are in the top 10,000 of the ranked search results. In such an embodiment of the invention, the search engine does not generate or present seller-specific information for any search result whose ranking puts that search result beneath the top 10,000 of the ranked search results.

In one embodiment of the invention, after the search engine has determined a set of relevant search results based on the search query terms, and after the search engine has ranked those search results by relevance, the search engine searches the ranked search results, in ranked order, for a particular search result that has a URL that is associated with at least one selling entity that is associated with a rating that is "N" or higher (where N is some specified number). Such a rating may be derived from ratings that were assigned to a selling entity by other entities that previously interacted with the selling entity, for example. In one embodiment of the invention, "N" is a specified rating that does not take into account any information about the searching user. In another embodiment of the invention, "N" is a rating that is obtained or derived from criteria that are specified by or automatically learned about the searching user (e.g., criteria that are associated with the searching user's buying entity account). In one embodiment of the invention, the search engine generates and presents seller-specific information only for enhanceable search results that are relevance-ranked at least as high as the particular search result. In such an embodiment of the invention, the search results are guaranteed to contain seller-specific information for at least one search result that is associated with a selling entity with a relatively "good" (either generally or specifically considering the searching user's interests) rating. Additionally, in such an embodiment of the invention, the search results also might contain seller-specific information for search results that are relevance-ranked higher than the particular search result, but which are associated with selling entities whose ratings are not as "good." Thus, in one embodiment of the invention, a first search result whose URL is associated with a highly rated selling entity might appear lower in an ordered list of search results than a second search result whose URL is associated with a lowly rated selling entity, due to the second search result being much more relevant, in light of the search query terms, than the first search result.

As is discussed above in Section VI, in one embodiment of the invention, a registered buying entity specifies one or more filter criteria, which are then stored in association with the buying entity's account. Given a particular buying entity's filter criteria, a "filter score" may be determined for a particular selling entity based on the extent to which the particular selling entity's seller attributes satisfy the particular buying entity's filter criteria. Such filter scores may be used to determine the set of search results for which seller-specific information will be generated and presented. Specifically, in one embodiment of the invention, after the search engine has determined a set of relevant search results based on the search query terms, and after the search engine has ranked those search results by relevance, the search engine searches the ranked search results, in ranked order, for a particular search result that is associated with a URL that is associated with at least one selling entity that is associated with a filter score (which depends on the searching user's specified filter criteria) that is "N" or higher (where N is some specified number). In one embodiment of the invention, "N" is a number that is specified by the searching user. In another embodiment of the invention, "N" is a number that does not vary from user to user. In one embodiment of the invention, the search engine generates and presents seller-specific information only for enhanceable search results that are relevance-ranked at least as high as the particular search result. In such an embodiment of the invention, the search results are guaranteed to contain seller-specific information for at least one search result that is associated with a selling entity with a relatively "good" filter score. Additionally, in such an embodiment of the invention, the search results also might contain seller-specific information for search results that are relevance-ranked higher than the particular search result, but which are associated with selling entities whose filter scores (relative to the searching user's specified filter criteria) are not as "good." Thus, in one embodiment of the invention, a first search result whose URL is associated with a selling entity who has a high filter score might appear lower in an ordered list of search results than a second search result whose URL is associated with a selling entity who has a low filter score, due to the second search result being much more relevant, in light of the search query terms, than the first search result.

In one embodiment of the invention, after the search engine has determined a set of relevant search results based on the search query terms, and after the search engine has ranked those search results by relevance, the search engine determines or estimates a maximum number "N" of enhanceable search results for which seller-specific information can be generated (and, in one embodiment of the invention, presented) within a specified amount of time (e.g., one second). In such an embodiment of the invention, the search engine generates and presents seller-specific information for no more than "N" of the enhanceable search results, even if the relevant search results contain more than "N" enhanceable search results. Typically, in such an embodiment of the invention, the "N" results for which the search engine generates seller-specific information are those that have the highest relevance rankings among all of the search results that are associated with URLs that are associated with at least one registered selling entity. For example, if 50 of the relevant search results are associated with URLs that are associated with at least one registered selling entity, but if the search engine can only generate and present seller-specific information for at most twelve search results within the specified amount of time (e.g., one second), then, in one embodiment of the invention, the search engine generates and presents seller-specific information for only the twelve highest-ranked (by relevance) search results that are associated with URLs that are associated with at least one registered selling entity.

As is discussed above, in certain embodiments of the invention, seller-specific information is generated and presented for only selected search results—typically, those which have sufficiently high relevance rankings. Additionally, in certain embodiments of the invention, the search engine does not even check whether a search result's URL is associated with at least one registered selling entity unless that search result already satisfies criteria such as those described above.

Several different techniques for limiting the number of enhanceable search results for which seller-specific information is generated and presented are discussed above. Additionally, in various embodiments of the invention, combinations of these techniques or combinations of variations of these techniques may be employed to limit the number of enhanceable search results for which seller-specific information is generated and presented. By using the foregoing techniques, search results can be generated and presented quickly enough to satisfy user expectations while also providing users with at least some enhanced seller-specific information about search results.

XX. Showing Teasers to Unregistered Searchers

As is discussed above in Section XVII, in one embodiment of the invention, if the user to whom a search results page is going to be presented is a registered buying entity, and if the user's buying entity attributes do not satisfy a particular selling entity's criteria, as specified in the particular selling entity's attributes, then search results that are associated with a URL that is associated with the particular selling entity are omitted or removed from the search results page before the search results page is presented to the user. This helps protect selling entities from paying fees to search engine operators for link activations by some "unqualified" buying entities who probably would not engage in profitable business with those selling entities.

The foregoing technique may be applied under circumstances where the user is a registered buying entity that is associated with known buyer attributes. Additionally or alternatively, in one embodiment of the invention, if the searching user (i.e., the user that submitted the query terms to the search engine) does not have a buying entity account established with the business-to-business connectivity service, then certain search results, or selected aspects thereof, may be fully or partially hidden from the searching user. A particular selling entity might indicate, via the seller attributes that are associated with his selling entity account, that the particular selling entity only wants to be seen by searching users that have registered buying entity accounts established with the business-to-business connectivity service. In one embodiment of the invention, if all of the selling entities that are associated with a particular URL have so indicated, then significant identifying details about search results that are associated with the particular URL might be obscured within search results pages that are presented to searching users who have not yet established registered buying entity accounts. Under such circumstances, the searching user may be given enough information to know that the search engine actually found a search result that was relevant in light of the submitted query terms, but, at least in one embodiment of the invention, the user is not told much else about that search result.

In one embodiment of the invention, if the searching user does not have a registered buying entity account, then, for certain search results (even those for which seller-specific information would otherwise be available), seller-specific information, or at least some aspects thereof, is not shown for those certain search results. In one embodiment of the invention, instead of a title, description, and URL for such a search result, a "teaser" for the search result may be displayed. The "teaser" informs the searching user that the "seller displays only to members (join to match)." The "join to match" text in the teaser may be presented within a hyperlink which, when activated by the searching user, directs the searching user's Internet browser to a particular page on the business-to-business connectivity service's web site. The particular page includes fields, controls, and instructions that enable the searching user to establish a buying entity account with the business-to-business connectivity service. In such an embodiment of the invention, the searching user is unable to reach the web page that is associated with the search result (because the search result's URL is obscured) until the searching user establishes a registered buying entity account. In such an embodiment of the invention, the searching user may be prevented from even identifying the business that is associated with the search result until the searching user establishes a registered buying entity account.

In one embodiment of the invention, if the searching user does not have a registered buying entity account, then, for certain search results, along with "teasers" (which may be displayed instead of information that identifies and describes such search results), ratings (potentially average or composite ratings) for one or more selling entities that are associated with those search results' URLs is shown. The "teaser" entices the buying entity to establish a registered buying entity account in order to view more detailed information about an obscured search result. In such an embodiment of the invention, the presence of the rating in connection with an obscured search result informs the searching user that one or more selling entities associated with the obscured search result's URL have acquired a high rating from registered buying entities. The fact that the one or more selling entities have acquired a high rating may motivate the searching user to establish a buying entity account with the business-to-business connectivity service so that the searching user can view information that identifies the business to which the obscured search result corresponds.

In one embodiment of the invention, if the searching user does not have a registered buying entity account, then, for certain search results, indications of the current unavailability of customized filter scores for those search results (due to the searching user's lack of a buying entity account) are displayed in connection with those search results. For example, such an indication might read "score: join to see." Examples of this may be seen in FIGS. 5 and 6, which are described below. In cases where no filter criteria have been specified for the searching user because the searching user does not even have a buying entity account that specifies such filter criteria, such an indication may motivate the searching user to establish a buying entity account so that the searching user can view, for certain search results, filter scores that are customized based on filter criteria of the searching user's own choosing.

In one embodiment of the invention, if the search results include one or more obscured search results (in which information about the businesses or URLs associated with the search results have been hidden deliberately from searching users who lack registered buying entity accounts), then the search results page also contains text that indicates that at least some of the search results were obscured. In one embodiment of the invention, the text indicates the number of selling entities for which the searching user potentially could view seller-specific information if the searching user established a registered buying entity account. For example, in one embodiment of the invention, such text might read, "12 sellers not displayed until a match is confirmed (join to match)." An example of this may be seen in FIG. 5, which is described below. This lets the searching user know how much information he is missing due to his lack of a registered buying entity account.

After the searching user has established a buying entity account, the searching user's Internet browser may be redirected to a refreshed version of the search results page that the user's Internet browser had displayed prior to the establishment of the searching user's buying entity account. In the refreshed version, one or more of the search results that had previously been obscured might appear in complete detail due to the searching user's establishment of a buying entity account. If the buying entity account is associated with filter criteria, then user-customized filter scores for such search results also might appear in the refreshed version. However, one or more of the previously obscured search results also might be omitted entirely from the refreshed version due to the buying entity attributes of the searching user's buying entity account failing to satisfy one or more criteria of selling entities that are associated with those search results. Such selling entities might wish to not be investigated further by buying entities that have buyer attributes such as those that are associated with the searching user's buying entity account.

FIG. 5 is a diagram that illustrates a portion of a search results page in which a search result has been obscured due to the searching user's lack of a registered buying entity account, according to an embodiment of the invention. The search results page indicates that 12 sellers were not displayed, and will not be displayed to the searching user until the searching user specifies, to the business-to-business connectivity service, buyer attributes that describe the searching user—buyer attributes that may be used to determine the levels of those 12 sellers' interests in the searching user. Typically, the searching user specifies these buyer attributes by establishing a registered buying entity account with the business-to-business connectivity service. The search results page additionally contains a hyperlink that invites the searching user to join the business-to-business connectivity search by establishing a registered buying entity account.

As can be seen in FIG. 5, one of the search results has been deliberately obscured so that (a) the searching user cannot determine the identity of the organization that is associated with the search result and (b) the searching user cannot activate any hyperlink that would direct the searching user's Internet browser to that organization's web site. However, in connection with this "mystery" search result, the search results page shows a composite rating for potentially several selling entities that are associated with that search result's URL. If the rating is sufficiently high, then the searching user will likely want to obtain more information about the search result, and may establish a buying entity account in order to do so.

Details about certain search results may be obscured by a search engine at the time that the search engine generates a search results page, before the search engine transmits the search results page toward the searching user's Internet browser.

FIG. 11 is a diagram that illustrates a split screen search results page, according to an embodiment of the invention. Above the split, personalized search results, based on the attributes (e.g., filter criteria) specified in the searching entity's buying entity account, are shown, while below the split, more traditional relevance-ranked search results are shown. In one embodiment of the invention, the traditional results below the split are not ranked on the searching user's filter criteria and selling entities' ratings, while the results about the split are ranked based at least in part on these factors. The traditional relevance-ranked results shown below the split allow the searching user to create an invitation for associated companies to have seller join the online business-to-business connectivity service to become listed in the personalized results that are shown above the split. In one embodiment of the invention, the personalized results shown about the split indicate, for each result, a number that indicates that result's relevance ranking under the traditional relevance ranking scheme. This number may be useful so that the searching user knows how deep the search algorithm had to go in order to find a good match. If the search algorithm had to go very deep to obtain a particular search result, then the searching user might not want to follow up on the search result's URL, but might instead choose to focus on the traditional search results shown below the split so that potentially better-fit companies can be invited to join, and so that these companies can be evaluated for personalized matches.

As is discussed above, in one embodiment of the invention, multiple selling entities may be associated with the same URL. Some selling entities that are associated with a particular URL might be willing to display seller-specific information to searching users who lack registered buying entity accounts, while other selling entities that are associated with that particular URL might not be willing to display seller-specific information to searching users who lack registered buying entity accounts. In one embodiment of the invention, for each enhanceable search result, the search results page displays, in connection with that enhanceable search result, a hyperlink whose text says "more." An example of this may be seen in FIG. 5. User activation of such a hyperlink causes the searching user's Internet browser to retrieve and display per-selling-entity information about one or more selling entities that are associated with the search result's URL. An example of such per-selling-entity information is shown in FIG. 6, which is described in the following section.

XXI. Showing Teasers on a Per-Selling-Entity Basis

FIG. 6 is a diagram that illustrates per-selling-entity information about each of multiple selling entities that are associated with the same URL, according to an embodiment of the invention. In this example, four separate selling entities are associated with the same URL. However, two of the selling entities (the first two listed) have specified, in the seller attributes that are associated with their selling entity accounts, that they do not want certain seller-specific information to be displayed to searching users who do not yet have a buying entity account. These two selling entities have refused to deal with unknown users. Therefore, while the per-selling-entity information contains seller-specific information about the last two listed selling entities, such as those entities' names, companies, and products, and includes hyperlinks by which the searching user may pose a question or submit an invitation to those entities, the per-selling-entity information omits such seller-specific information and hyperlinks relative to the first two listed selling entities. Instead of seller-specific information about the first two listed selling entities, the per-selling-entity information informs the searching user that certain aspects of the seller-specific information about those selling entities, such as those entities' names, companies, and products, is only available to users who have established registered buying entity accounts with the business-to-business connectivity service. As is shown in FIG. 6, the per-selling-entity information for the first two listed selling entities may include hyperlinks that invite and enable a searching user to join the business-to-business connectivity service by establishing a registered buying entity account.

Additionally or alternatively, in one embodiment of the invention, under circumstances where multiple selling entities are associated with the same URL, entries for some of those selling entities may be omitted entirely from a per-selling-entity-based display, such as is shown in FIG. 6, if (a) some of the selling entities have specified, in their seller attributes, that information about those selling entities should be presented only to registered buying entities that are associated with buyer attributes that satisfy criteria specified by those selling entities, and (b) the buyer attributes associated with the searching user's registered buying entity account do not satisfy those selling entities' specified criteria. In such an embodiment of the invention, instead of displaying "teasers" for those selling entities, entries for those selling entities may be omitted from the display entirely, so that the "unqualified" searching user never even becomes aware of their existence. In one embodiment of the invention, a "teaser" for a particular selling entity is displayed only to searching users who have not yet established buying entity accounts, rather than to "unqualified" searching users whose buying entity accounts are associated with buyer attributes that do not satisfy criteria that is associated with the particular selling entity's account.

XXII. Factors Used to Select Sponsored Search Results

Along with organic search results, a search results page may include one or more prominently displayed sponsored search results, described above in Section XVIII. Usually, only a limited number of sponsored search results can be practically displayed on a search results page. The sponsored search results that are displayed on a search results page may be selected from among multiple relevant (in view of the query terms) sponsored search results based at least in part on an amount of money that the sponsors of those sponsored search results were willing to pay to the search engine's owner in response to a user's activation (i.e., clicking) of a hyperlink that is associated with the sponsored search result. The amount that each sponsor is willing to pay is sometimes determined via an online auction in which each sponsor bids the amount that he is willing to pay to the search engine's owner per hyperlink activation.

Sometimes, the amount of money that a sponsor is willing to pay in exchange for a hyperlink activation is not the only factor that is used to select which sponsored search results will be displayed on the search results page. Among other factors that a search engine may use to select a sponsored search result is the probability that a searching user will actually activate (i.e., click on) a hyperlink that is associated with that sponsored search result. For example, for each relevant sponsored search result, a search engine may multiply (a) that sponsored search result's activation probability by (b) the amount of money bid by that sponsored search result's sponsor, thereby producing a score for that sponsored search result. The search engine may then present, on the search results page, the "N" sponsored search results with the highest scores, where "N" is some specified number. A sponsored search result's activation probability may be determined by dividing (a) the total number of times that the sponsored search result has been displayed by (b) the total number of times that the sponsored search result's hyperlink was actually activated.

Thus, each sponsored search result may be associated with a separate score that is used to determine whether or not that sponsored search result will be chosen for display on a search results page. In one embodiment of the invention, the score for a sponsored search result is determined based on both (a) an amount of money that the sponsored search results' sponsor is willing to pay for a hyperlink activation and (b) the reputations of one or more selling entities that are associated with that sponsored search result's URL. In this regard, a selling entity's reputation may be determined based at least in part on one or more ratings that registered buying entities have submitted (via the online business-to-business connectivity service) for the selling entity after interacting with that selling entity in a business capacity.

In one embodiment of the invention, the score for a sponsored search result is determined based on both (a) an amount of money that the sponsored search results' sponsor is willing to pay for a hyperlink activation and (b) a quality of a match between (1) one or more selling entities that are associated with that sponsored search result's URL and (2) the searching user, assuming that the searching user is a registered buying entity. In this regard, the quality of the match may be determined based at least in part on the extent to which the buyer attributes associated with the searching user's buying entity account satisfy criteria that are associated with the selling entity accounts of the selling entities that are associated with the sponsored search result's URL.

In one embodiment of the invention, the score for a sponsored search result is determined based on both (a) an amount of money that the sponsored search results' sponsor is willing to pay for a hyperlink activation and (b) the filter scores generated for one or more selling entities that are associated with that sponsored search result's URL. For example, assuming that the searching user has a buying entity account that is associated with filter criteria, a separate filter score may be determined for each of the sponsored search result's associated selling entities based on the extent to which those selling entities' associated seller attributes satisfy the filter criteria. An overall filter score for the sponsored search result may be determined by averaging or otherwise compositing the filter scores for each of these selling entities. Then, the score for the sponsored search result may be determined at least in part by multiplying the sponsored search result's overall filter score by the amount of money that the sponsored search result's sponsor was willing to pay for a hyperlink activation.

In various alternative embodiments of the invention, different combinations of the above techniques may be employed to determine scores that a search engine uses to select sponsored search results for presentation within a search results page.

XXIII. Charging Advertisers for Business Events Rather than Hyperlink Activations Traditionally, Internet search engine owners have charged the sponsor of a sponsored search result a fee for each time that a searching user activates (i.e., clicks on) a hyperlink that is associated with that sponsored search result. Unfortunately, many of these hyperlink activations may be performed by users who activate the hyperlink either accidentally or out of mild curiosity but with no real interest in pursuing a business relationship with the sponsor. Even worse, some Internet search engine owners are suspected to have turned a blind eye to others' activations of the hyperlinks of sponsored search results repetitively in order to generate revenue for the search engine owner nefariously. Activities of the latter sort are called "click fraud." Search engine owners make money from such activities, and are not highly motivated to curtail such activities, because doing so would reduce the search engine owners' revenue. Click fraud can waste large quantities of sponsors' money.

In order to prevent this waste from occurring, in one embodiment of the invention, an Internet search engine owner does not charge a sponsor of a sponsored search result a fee for each time that the sponsored search result's hyperlink is activated by a user. Instead, in such an embodiment of the invention, the search engine owner charges a sponsor of a sponsored search result a fee in response to the hyperlink activator's performance of a business event relative to the sponsor's business at a later time.

In one embodiment of the invention, the amount that a sponsor bids to the search engine owner is an amount that the sponsor is willing to pay the search engine's owner in exchange for a hyperlink activator's performance of a business event (e.g., a purchase from the sponsor's business) rather than a mere activation of a hyperlink. For example, in an online auction, a sponsor might bid a certain amount that he is willing to pay the search engine's owner if the activator of the sponsor's sponsored search result's hyperlink actually ends up purchasing products or services from the sponsor or the sponsor's business. For another example, in an online auction, a sponsor might bid a certain amount that he is willing to pay the search engine's owner if the activator of the sponsor's sponsored search result's hyperlink enters into a specified stage of the multi-stage pipeline that is maintained by the online business-to-business connectivity service.

For example, in one embodiment of the invention, each hyperlink that is associated with a sponsored search result contains embedded codes that identify (a) the search engine that presented that sponsored search result and (b) the sponsor of that sponsored search result. When such a hyperlink is activated by a user, the activation of that hyperlink directs the user's Internet browser to a page that is served by the online business-to-business connectivity service. The online business-to-business connectivity service's server receives the embedded codes when the user's Internet browser requests the page. Thus, the online business-to-business connectivity service knows the identity of the sponsor and the identity of the search engine that presented the sponsored search result that led the user to the service.

In one embodiment of the invention, the page served by the online business-to-business connectivity service invites the user to interact with the sponsor, who is associated with at least one registered selling entity account, in a business capacity. The page may also invite the user to establish a buying entity account, if the user has not already done so. In one embodiment of the invention, the online business-to-business connectivity service and the search engine co-exist on a single network, so that data does not need to be passed back and forth between the service and the search engine over the Internet. The search engine and the service may be tightly integrated.

As is described above in Section V, in one embodiment of the invention, buying entities and selling entities can progress with each other through successive stages of a business relationship through a multi-stage "pipeline." The current state of an interacting buying entity and selling entity within the pipeline is tracked by the online business-to-business connectivity service. In one embodiment of the invention, a buying entity's elective entry (e.g., by activating a corresponding hyperlink) into a stage of the pipeline with the sponsor selling entity causes the online business-to-business connectivity service to record the event and to notify an owner of the search engine (identified by the embedded code) that a particular stage of the pipeline has been entered with the sponsor selling entity. In response to receiving this notification, the search engine owner may charge the sponsor selling entity a fee.

In one embodiment of the invention, the fee that the search engine owner charges the sponsor selling entity is based on the stage of the pipeline into which the buying entity entered with the sponsor selling entity. For example, lesser fees may be charged for entries into earlier stages of the pipeline, and greater fees may be charged for entries into later stages of the pipeline.

In one embodiment of the invention, when an actual sale transpires through the business-to-business connectivity service, the service notifies the owner of the search engine identified by the embedded code of an amount of money that the buying entity paid the sponsor selling entity in the sale, as indicated to the service by the buying entity and/or sponsor selling entity. In such an embodiment of the invention, the owner of the search engine may charge the sponsor selling entity a fee that is based, at least in part, on the amount of money that the buying entity paid the sponsor selling entity. For example, the search engine owner's fee may be a specified percentage of the sale amount. Alternatively, the search engine owner's fee may be based on an average of previous sale amounts (rather than an actual sale amount) that was previously communicated by the selling entity to the buying entity.

XXIV. Bottoms-Up Advertising

Blogging has had a huge impact on journalism. There are newspapers that are struggling now because people have turned to sources other than newspapers to get news. People seeking news can select from among influential bloggers, such as insiders and industry watchers. Essentially, people get to pick their own journalists. Bloggers often perform the same services, for free, for which newspapers traditionally have charged subscription fees. Newspapers usually need to pay their professional journalists. Newspaper readers often perceive these professional journalists to be biased. People are finding that, instead of reading a newspaper that might issue only once per day, they can obtain totally current and fresh news at any time from bloggers that they have personally selected. Thus, blogging has had a significant impact on journalism indeed.

The contrasting paradigms or approaches under which newspapers and blogs operate may be called "top-down" and "bottoms-up," respectively. Traditional news outlets, such as newspapers, magazines, and television news programs, believe that it is their role to sift through all available news and determine, themselves, which news ought to be presented to their subscribers or viewers. This belief follows the "top-down" approach. In times past, people could find information about current events from only a limited number of these traditional news outlets. Seekers of news are diverse, however, and now realize that they have options. When it comes to news, one size does not fit all. Nowadays, news seekers know that they do not need to accept the traditional news outlets' paternalistic, self-appointed role as the ultimate arbiters of newsworthiness. Modern news seekers know that they have an abundance of sources of news from which to choose, and do not need to consume the journalistic pabulum which traditional news outlets offer to them. Blogging is becoming exceedingly influential.

Thus, traditional news outlets have followed a "top-down" approach that people are now rejecting. Traditional news outlets now realize the public is rejecting the "top-down" approach, and, in response, some of the traditional news outlets are beginning to turn to blogging themselves.

In the journalism industry and in other industries, there has been some resistance, from those who have traditionally been in control of information, against bloggers who are subordinate to them. Businesses often have their own selected and approved public relations outlets who serve as the public faces of those businesses. The owners and operators of these businesses often want to control what kind of information about their businesses becomes available to the public. These owners and operators achieve this control by permitting information about their businesses to flow only through their selected and approved public relations outlets. The public relations outlets are able to "spin" such information in a light that is most positive to the businesses. Business owners and operators are often disturbed when employees within their companies present information about their companies in the employees' personal blogs, because the owners and operators are less able to exert control over the content that flows to the public through these personal blogs. Public relations departments and firms are largely unable to approve the material presented on these personal blogs before that material reaches the public.

Despite this resistance, the public is generally more interested in open, honest, candid, and frank information about companies and their products and services than in professionally "spun" information that such companies want the public to have. Some of the more enlightened companies have come to realize that resistance against the blogging trend is futile, and have given their blessings to employee bloggers who work for them. Public relations departments and firms no longer have a "top-down" stranglehold on information.

Advertising also traditionally has been administered according to a "top-down" approach. Advertising firms traditionally have been the sole controllers of the content that is presented to the public about companies, products, and services in advertisements. Just as the "top-down" approach has failed in other contexts, though, the "top-down" approach to advertising is also likely to wither away. What the public really wants to receive is "un-spun" information about individuals and their reputations, companies and their reputations, and products/services and their reputations. The public really prefers a "bottoms-up" approach, in which the reputations of companies' employees are not controlled by the company itself. Unlike "top-down" advertising, which comes through one person or one committee, "bottoms-up" advertising may come through any number of people in an organization.

A business may advertise through an Internet search engine by bidding specified amounts of money for "ad words" of that business' choosing. If a business submits the highest (or one of the highest) bids for an ad word that ends up being submitted to the search engine as a query term, then the search engine automatically places a business-approved advertisement for that business in the search results page that the search engine generates and presents to a searching user who submitted the query term. As used herein, advertisements that are included in search results pages as the result of the appearance of an ad word in a set of search query terms are also considered to be "sponsored search results."

Usually, no more than one person or department from a particular company will bid on ad words on behalf of that company. This person usually will be assigned, by the company, the task of bidding on ad words on behalf of the company. This person might also be assigned the task of determining whether the advertisements that are being displayed in connection with the ad words are generating any revenue for the company. Those who are not affiliated with the company in any way typically do not bid on ad words on behalf of the company, since they have little or no interest in generating revenue for the company. Additionally, because it usually makes little sense for multiple affiliates, employees, or agents of the same company to bid against each other for the same ad words, a company usually does not encourage multiple affiliates, employees, or agents of that company to bid for ad words on behalf of that company. Instead, the company's approved representative performs all of the bidding for ad words on behalf of that company. This is an example of a "top-down" approach.

"Bottoms-up" advertising is similar in some respects to "bottoms-up" journalism and blogging. "Bottoms-up" advertising integrates word-of-mouth content and reputations with advertisements or other information. "Bottoms-up" advertising approaches might initially take hold within smaller companies in which a "top-down" advertising approach is already very similar to a "bottoms-up" advertising approach due to the many roles played by a relatively small number of people in the company. In smaller companies, decision makers for various different kinds of decisions are often the same people. In smaller companies, these people usually operate under the same budgets.

Larger companies might initially resist the "bottoms-up" advertising approach, because these companies are more likely to want to retain control over advertising and to stage-manage the reputations of their companies. In larger companies, the decision makers are often high-level managers who are far removed from the base of the company, which comprises employees such as the company's salespeople who work in the marketplace. Decision makers in larger companies often operate under different budgets.

The general public does not like professional public relations outlets. The general public does not trust the advertisements that companies' professional advertising outlets put forth. However, the general public is more likely to trust the companies' workers who are putting their personal reputations "on the line" every time that those workers deal with an actual or potential customer.

The book *Citizen Marketers: When People Are the Message*, by Ben McConnell and Jackie Huba, makes some relevant points regarding customer's views of traditional "top-down" advertising. According to that book, "Research firm BIGresearch polled 15,000 people and asked them to rate the influence of media on their decision making. Word of mouth was number one." Additionally, "In a 2005 survey, Yankelovich Inc. discovered that 69 percent of Americans would pay for products that black out marketing and advertising." Furthermore, " . . . more than half of Americans avoid buying anything from a company that overwhelms them with advertising." Additionally, "For organizations with business interests in the United States, the idea that even 1 percent of 100 million people—1 million people—could create their own ads, their own marketing campaigns, and their own brand-specific communities without official permission, input, or control is either astoundingly cool or somewhat alarming." The book notes, "The disruption to the traditional structures of corporate communications is nothing short of stunning."

In one embodiment of the invention, anybody who is associated with a company or other organization can advertise on behalf of that company or organization. In one embodiment of the invention, a search engine or search engine owner receives a product offer or an advertisement from a person (i.e., a "bottoms-up advertiser") who is employed by an organization but is not employed by the organization in an advertising capacity. For example, the person might be an employee who does not even have authority from the organization to advertise on the organization's behalf. The product offer or advertisement may be of the person's own choosing, and might not be approved by the organization or anyone else who is affiliated with the organization. Later, when the search engine receives query terms from a searching user, the search engine determines search results and/or advertisements based at least in part on the query terms. These search results and/or advertisements may include organic search results, sponsored search results, and/or other advertisements (e.g., advertisements presented based on ad words). If the search engine determines that a particular search result or advertisement is associated with the organization, then, when the search engine generates the search results page, the search engine includes, in the search results page, its hyperlinks or other method of association, in conjunction with the particular search result or advertisement, the product offer or advertisement that was received from the person.

XXV. Filtering on a Buying Entity's Filter Criteria

As is discussed above, in one embodiment of the invention, selling entities may opt to not have their identities revealed to buying entities that are associated with buying entity-specified buyer attributes that do not satisfy certain criteria that are specified by the selling entities themselves. For example, a selling entity might specify that its identity, and/or other seller-specific information about that selling entity, should not ever be presented to buying entities whose buyer attributes indicate that those buying entities are not located in a geographic region specified by the selling entity (e.g., the geographic region in which the selling entity does business).

Additionally or alternatively, in one embodiment of the invention, selling entities can opt to not have their identities revealed to buying entities whose buying entity-specified criteria indicates that those selling entities would not be a good match for those buying entities. In such an embodiment of the invention, whether or not a particular selling entity's identity will be hidden from a particular buying entity may be based on whether the particular selling entity's seller attributes satisfy the particular buying entity-specified criteria (e.g., filter criteria) rather than or in addition to whether the particular buying entity's buyer attributes satisfy the particular selling entity-specified criteria. Thus, in one embodiment of the invention, selling entities can elect to be hidden from certain buying entities to which those selling entities otherwise would be presented if those certain buying entities' self-specified criteria tend to indicate that those selling entities are not the kind with which those certain buying entities are seeking to interact in a business capacity.

For example, if a selling entity only sells products that cost more than $1,000, then that selling entity might specify, via preferences that are stored in association with that selling entity's account, that the selling entity does not want to be revealed to any buying entities whose self-specified criteria indicate that those buying entities are only seeking selling entities who sell products that cost $1,000 or less. As a result, a search engine or other mechanism might prevent the placement, into a search results page or other document that will be presented to such a buying entity, the selling entity's identity and/or other seller-specific information pertaining to the selling entity.

XXVI. Biasing Ad Words Toward Organizations Associated with Registered Selling Entities As is discussed above, whether or not a particular company's advertisement is displayed in a search results page in response to a particular ad word being submitted within search query terms usually depends on an amount of money that the particular company bid (i.e., indicated that it was willing to pay) for the display of the particular company's advertisement in a search results page when the particular ad word has been submitted within search query terms. Traditionally, if multiple companies have bid for the same ad word, then, when the ad word is received within a set of search query terms, then the company (or limited set of companies) that submitted the highest bid(s) for that ad word, get its advertisements displayed on the search results page that is presented to the user who submitted the query terms.

In one embodiment of the invention, an incentive is provided to such companies to encourage those companies to have their employees and agents establish registered selling entity accounts with the online business-to-business connectivity service. In such an embodiment of the invention, at least one of the factors that is used to determine which company's advertisement will be included in a search results page is whether or not at least one registered selling entity is associated with that company; such an association may be indicated through a selling entity's seller attributes, which, as described above, may indicate the identity of the company with which the selling entity is affiliated (e.g., due to the selling entity's employment by that company). Thus, in one embodiment of the invention, each company that bids for an ad word may have its bid weighted (e.g., by the search engine) favorably if that company is associated with at least one registered selling entity. Conversely, in one embodiment of the invention, each company that bids for an ad word may have its bid weighted unfavorably if that company is not associated with any registered selling entities.

XXVII. "Free Click" Privileges for Organizations Associated with Registered Selling Entities As is discussed above, search engines sometimes display sponsored search results that are designed, submitted, and approved by the companies or other organization who sponsor those search results. Such companies traditionally have bid some amount of money that they have been willing to pay a search engine owner for each time that a user of the search engine activates hyperlinks that are associated with those companies' sponsored search results. The activation of such a hyperlink usually directs the activator's Internet browser to the web site of the sponsor of the sponsored search result that is associated with that hyperlink. The activation of such a hyperlink traditionally signals the search engine owner to charge the sponsor a fee that is commensurate with the amount that the sponsor previously bid.

However, in one embodiment of the invention, whenever a searching user activates a sponsored search result's hyperlink, the search engine (or some other mechanism) determines whether the URL of that sponsored search result is associated with at least one registered selling entity in the online business-to-business connectivity service. In response to a determination that the URL is associated with at least one registered selling entity, then search engine (or other mechanism) does not charge the sponsor of the sponsored search result any fee. This motivates companies and other organizations to encourage their employees, agents, and affiliates to establish registered selling entity accounts with the online business-to-business connectivity service.

Instead of charging registered selling entity-affiliated sponsors fees in response to activations of those sponsors' sponsored search results' and other advertisements' hyperlinks, in one embodiment, the search engine owner charges such sponsors fees in response to a hyperlink-activating user's performance of some business activity (e.g., a sale or entry into a specified stage of a multi-stage pipeline) with the sponsors' company, employees, or agents. An example of such an approach is described above in Section XXIII.

XXVIII. Filtering Sellers and Advertisers Based on Experiences with Trusted Buyer Network As is discussed above in Section X, using a filtering mechanism, a user may cause only the search results that are associated with at least one trusted buyer network connection to be displayed on the search results page. The use of this mechanism causes only search results that are associated with a URL that is associated with at least one selling entity that has previously interacted with a registered buying entity in the user's trusted buyer network to be displayed on the search results page. Thus, by using such a mechanism, the list of search results can be narrowed, generally, to those that are known by registered buying entities whose opinions the user trusts.

In one embodiment of the invention, each selling entity that has received at least one rating from a buying entity in the searching user's trusted buyer network is assigned a trusted buyer network score that is based (in one embodiment of the invention, solely) on the ratings that buying entities in the searching user's trusted buyer network have given to that selling entity. In one embodiment of the invention, identities of (and possibly other seller-specific information about) selling entities that are associated with URLs of search results are placed in the search results page only if those selling entities' trusted buyer network scores meet a specified threshold. In one embodiment of the invention, selling entities whose trusted buyer network scores do not meet the specified threshold are completely excluded from the search results page. This exclusion can be advantageous for selling entities who have had bad experiences with other buying entities whose opinions the searching user is likely to trust more than other sources of information about such selling entities.

Alternatively, in one embodiment of the invention, selling entities whose trusted buyer network scores do not meet the specified threshold are still included in the search results page.

XXIX. Preventing Unauthorized Selling Entities From Associating with a Sponsored Search Result's URL As is discussed above, in one embodiment of the invention, registered selling entities may specify a company or URL with which those selling entities want to be associated. In one embodiment of the invention, the association of a selling entity with a URL causes seller-specific information about that selling entity (potentially including rating information for that selling entity) to become available to a searching user whenever a sponsored search result that is also associated with the URL is presented to the searching user in a search results page. Companies who bid money in hopes of having their sponsored search results presented to a searching user do not want information about unauthorized selling entities to be presented in connection with their sponsored search results. This may be especially so if those unauthorized selling entities are not affiliated with these companies in any way whatsoever, and/or if those unauthorized selling entities have received poor ratings from buying entities through the online business-to-business connectivity service.

Therefore, in one embodiment of the invention, the selling entity (or other entity) that actually bids for an ad word or sponsored search result is given control over which other selling entities may associate themselves with a specified URL that is connected to an advertisement or sponsored search result. In the following discussion, the selling (or other) entity that actually bids for an ad word or sponsored search result is called the "bidding entity."

In one embodiment of the invention, whenever a selling entity attempts to associate itself with a URL through the online business-to-business connectivity service, the service determines whether that URL is associated with a bidding entity. If the URL is associated with a bidding entity, then the service notifies the bidding entity (e.g., via e-mail or other communication) that a selling entity is attempting to associate itself with the bidding entity's URL. The service requests and receives, from the bidding entity (e.g., through the bidding entity's interaction with the service via an Internet browser), the bidding entity's decision as to whether or not the bidding entity will permit the selling entity to associate itself with the bidding entity's URL. Until the service has obtained the bidding entity's permission to allow the selling entity to associate itself with the bidding entity's URL, the service prevents the selling entity's account from being associated with the bidding entity's URL.

If the bidding entity gives permission for the selling entity to be associated with the bidding entity's URL, then the service associates the selling entity's account with the bidding entity's URL. Thus, in one embodiment of the invention, the only selling entities for which seller-specific information is presented in connection with a sponsored search result are selling entities that have obtained the express permission of the bidding entity who "owns" the sponsored search result's URL by virtue of actually placing the winning bid for the sponsored search result.

Additionally or alternatively, in one embodiment of the invention, the only entity that is allowed to request or otherwise initiate the establishment of an association between any selling entity and a sponsored search result's URL is the bidding entity who "owns" the sponsored search result's URL by virtue of actually placing the bid for the sponsored search result. For example, in one embodiment of the invention, when a bidding entity places a bid, the bidding entity is asked to supply one or more identities of one or more selling entities that should be associated with the pertinent URL. The bidding entity may be given the opportunity to indicate, for each of one or more selling entities that might already be associated with the pertinent URL, whether information for that selling entity should be displayed in connected with a sponsored search result that is associated with the pertinent URL. In such an embodiment, the only selling entities that become associated with the pertinent URL are those that the bidding entity specifies.

XXX. Bidder Filtering of Seller-Specific Information

As is discussed above, in one embodiment of the invention, the bidding entity who "owns" the URL that is associated with a sponsored search result may control which selling entities are associated with that URL. As a result, the bidding entity may control the set of selling entities for which seller-specific information is displayed in connection with the search result on a search results page.

Furthermore, in one embodiment of the invention, the bidding entity can specify that, among the selling entities that are associated with the sponsored search result's URL, only those of the selling entities that satisfy criteria of the bidding entity's choosing should have their seller-specific information displayed in connection with the search result on a search results page.

For example, in one embodiment of the invention, the bidding entity specifies one or more geographic regions, and, in response, when the search engine (or other mechanism) displays the bidding entity's sponsored search result, selling entities who are not associated with any of the specified geographic regions (as indicated in the seller attributes of those selling entities' accounts) will not have their seller-specific information displayed in connection with the sponsored search result, even if those selling entities are associated with the sponsored search result's URL.

For another example, in one embodiment of the invention, the bidding entity specifies a rating threshold, and, in response, when the search engine (or other mechanism) displays the bidding entity's sponsored search result, selling entities whose ratings (e.g., rating assigned to those selling entities by registered buying entities) do not meet the rating threshold will not have their seller-specific information displayed in connection with the sponsored search result, even if those selling entities are associated with the sponsored search result's URL. Thus, in such an embodiment of the invention, the bidding entity can ensure that only the selling entities with the best reputations in the bidding entity's organization will be presented in conjunction with the bidding entity's sponsored search result.

The foregoing is not an exclusive list of bidding entity-specified buyer criteria/seller attributes based upon which selling entities may be selected for presentation in conjunction with a sponsored search result. In various embodiments of the invention, a bidding entity may, additionally or alternatively, specify any of the following buyer criteria/seller attributes, and selling entities may be selected for presentation in conjunction with a sponsored search result based on any of them: a company age, a company size (e.g., revenue), a company size (e.g., staff), a company status (e.g., public, private, non-profit, government—military, government—non-military, self-employed), a company name, a company's largest customer, a portion of a company's business that is with the company's largest customer, reference companies, a product or service cost (e.g., low, average, high), an annual return on investment (ROI) for the selling entity's products or services, a total cost of ownership (TCO) for the selling entity's products or services, a return on assets (ROA) for the selling entity's products or services, a payback period for the selling entity's products or services, capital offers (e.g., loans, credit, etc.), industries, delivery lead time, implementation timeframe, product or service information available without registering buyer name, product categories, a seller's individual rating, a seller's product rating, a company's rating, a seller's status (e.g., employee, contractor, self-employed, outside sales rep), seller resources (e.g., product or service demonstrations, no-obligation consultations, full-service support, in-house implementation team, peer-to-peer meeting with selling company), seller's name, and/or geographic support locations.

Selling entities may create corresponding profiles for matching purposes, and the selling entities may be selected for presentation in conjunction with a sponsored search result based on such profiles. In various embodiments of the invention, such buyer/searcher profiles may include, for example: a company name, a company status (e.g., public, private, non-profit, government—military, government—non-military, self-employed), a company size based on revenue, a company size based on staff, a buyer functional role (e.g., accounting, administrative, advertising, arts & entertainment, etc.), a buyer title, a buyer's number of subordinates, a buyer's annual budget control, how long a buyer has been in a role, a buyer's personal signing authority, a buyer's decision process (e.g., single person, committee, purchasing department, variable, other), a buyer's typical buying role (e.g., decision maker, decision influencer, proposal sponsor, other), a buyer's rating, a buyer's company rating, a buyer's geographic location, and/or a buyer's industries.

XXXI. Query Term-Based Bidder Selection of Seller-Specific Information

As is described above, in one embodiment of the invention, a bidding entity who "owns" a sponsored search result may limit, based on criteria of the bidding entity's choosing, the set of selling entities for whom seller-specific information will be shown in connection with the sponsored search result.

Additionally or alternatively, in one embodiment of the invention, the bidding entity who "owns" the sponsored search result may specify, for each selling entity that is associated with the sponsored search result's URL, one or more query terms that are to be associated with that selling entity. The online business-to-business connectivity service may establish associations between such selling entities and such query terms, for example. In such an embodiment of the invention, when the search engine (or other mechanism) determines that a particular sponsored search result is going to be placed in the search results page, the search engine (or other mechanism) selects, based at least in part on (a) the query terms received from the searching user and (b) the bidding entity-specified query terms that are associated with the selling entities, one or more of the selling entities that are associated with the particular sponsored search result's URL. In such an embodiment of the invention, the only selling entities for which the search engine (or other mechanism) displays seller-specific information in connection with the particular sponsored search result are the selling entities that were selected based on the query terms.

For example, in such an embodiment of the invention, if a search engine receives a first set of query terms from a searching user, then the search engine might display, in connection with a sponsored search result, seller-specific information for a first set of selling entities that are associated with both the sponsored search result's URL and one or more terms in the first set of query terms. However, in such an embodiment of the invention, if the search engine receives a second, different set of query terms from a searching user, then the search engine might display, in connection with the sponsored search result, seller-specific information for a second, different set of selling entities that are associated with both the sponsored search result's URL and one or more terms in the second set of query terms.

XXXII. Buyer Profile-Based Bidder Selection of Seller-Specific Information

In one embodiment of the invention, the bidding entity who "owns" a sponsored search result may specify, for each selling entity that is associated with the sponsored search result's URL, one or more buyer profiles (e.g., criteria that a buying entity's buyer attributes might or might not satisfy) that are to be associated with that selling entity. The online business-to-business connectivity service may establish associations between such selling entities and such buyer profiles, for example. In such an embodiment of the invention, when the search engine (or other mechanism) determines that a particular sponsored search result is going to be placed in the search results page, the search engine (or other mechanism) selects, based at least in part on (a) the buyer attributes associated with the searching user's buying entity account and (b) the bidding entity-specified buyer profiles that are associated with the selling entities, one or more of the selling entities that are associated with the particular sponsored search result's URL. In such an embodiment of the invention, the only selling entities for which the search engine (or other mechanism) displays seller-specific information in connection with the particular sponsored search result are the selling entities that were selected based on the buyer profiles.

For example, in such an embodiment of the invention, if a search engine receives query terms from a first searching user whose buying entity account is associated with a first set of buyer attributes, then the search engine might display, in connection with a sponsored search result, seller-specific information for a first set of selling entities that are associated with both the sponsored search result's URL and at least one buyer profile that the first set of buyer attributes match. However, in such an embodiment of the invention, if the search engine receives query terms from a second, different searching user whose buying entity account is associated with a second, different set of buyer attributes, then the search engine might display, in connection with the sponsored search result, seller-specific information for a second, different set of selling entities that are associated with both the sponsored search result's URL and at least one buyer profile that the second set of buyer attributes match. For example, seller-specific information for the first set of selling entities might be displayed to searching users/buying entities whose buyer attributes indicate that those searching users/buying entities are officers in their companies, while seller-specific information for the second set of selling entities might be displayed to searching users/buying entities whose buyer attributes indicate that those searching users/buying entities are not officers in their companies.

XXXIII. Ranking Search Results

Internet search engines typically rank search results based at least in part on the extent to which the resources (e.g., pages) to which those search results refer are relevant to the query terms received from the searching user. The rank produced for a search result based on the query term relevance of that search result's corresponding resource is called "relevance rank" herein. Search engines typically display search results on a search results page in relevance rank order.

In one embodiment of the invention, each search result's relevance rank is used as one factor in determining the order in which that search result will be presented relative to other search results on the search results page. In one embodiment of the invention, for each search result, that search result's ultimate presentation order among the several search results is based on various factors, some of which are described below, where one or more of those factors are weighted based on that search result's relevance rank order. In one embodiment of the invention, the factors used to determine search results' ultimate presentation order are weighted in such a way that search results which have a high relevance ranking tend to be promoted in presentation order, and search results which have a low relevance ranking tend to be demoted in presentation order.

For example, in one embodiment of the invention, each search result is ranked relative to other search results based on the filter scores that associated with the selling entities that are associated with those search results' URLs. Search results with higher filter scores tend to be ranked more favorably than search results with low filter scores. In one embodiment of the invention, the filter score for each search result is weighted, for purposes of determining presentation order, based on that search result's relevance rank. For example, if there are 100 million search results for a particular search query, and if a particular search result has a relevance rank of one million, then the particular search result's filter score may be weighted by (e.g., multiplied by) 0.99 (i.e., 1−(relevance rank/number of results)) for purposes of determining the particular search result's order in the search results page.

For another example, in one embodiment of the invention, each search result is ranked relative to other search results based on the buying entity-submitted ratings that associated with the selling entities that are associated with those search results' URLs. Search results with higher ratings tend to be ranked more favorably than search results with low ratings. In one embodiment of the invention, the rating for each search result is weighted, for purposes of determining presentation order, based on that search result's relevance rank. For example, if there are 100 million search results for a particular search query, and if a particular search result has a relevance rank of one million, then the particular search result's rating may be weighted by (e.g., multiplied by) 0.99 (i.e., 1−(relevance rank/number of results)) for purposes of determining the particular search result's order in the search results page.

For another example, in one embodiment of the invention, each search result is ranked relative to other search results based on the trusted buyer network scores that associated with the selling entities that are associated with those search results' URLs. Search results with higher trusted buyer network scores tend to be ranked more favorably than search results with low trusted buyer network scores. In one embodiment of the invention, the trusted buyer network score for each search result is weighted, for purposes of determining presentation order, based on that search result's relevance rank. For example, if there are 100 million search results for a particular search query, and if a particular search result has a relevance rank of one million, then the particular search result's trusted buyer network score may be weighted by (e.g., multiplied by) 0.99 (i.e., 1−(relevance rank/number of results)) for purposes of determining the particular search result's order in the search results page.

In one embodiment of the invention, the weighting discussed above is linear. However, in an alternative embodiment of the invention, the weighting discussed above is exponential, such that the weighting has considerably less influence beyond the highest relevance ranked search results. In yet another embodiment of the invention, the weighting discussed above is performed in a step-wise fashion so that, for example, the top 10% of search results are all weighted with a first weight, the next 10% of those search results are all weighted with a second weight, and so on. A variety of different possible weighting approaches may be implemented in a variety of different possible embodiments of the invention. The examples described above are not intended to be an exhaustive list of possible weighting approaches.

XXXIV. Organic Search Algorithm

Organic search results for an Internet search traditionally have been determined primarily based on the extent to which resources to which those search results refer are relevant to the query terms received by the search engine. For example, search results for a search query are usually selected based at least in part on how many times the query terms occur within pages to which the search results occur. For each page that contains a query term, a search result that refers to that page may be placed in the set of search results for the search query.

In one embodiment of the invention, search results are additionally or alternatively determined based at least in part on the attributes of the searching user, as represented by the buyer attributes that are associated with the searching user's registered buying entity account with the online business-to-business connectivity service.

In one embodiment of the invention, search results are additionally or alternatively determined based at least in part on the filter criteria that have been specified by the searching user, as represented within the buyer attributes that are associated with the searching user's registered buying entity account with the online business-to-business connectivity service. Thus, instead of or in addition to determining search results based on who the searching user is and what his attributes are, search results may be determined based on the attributes for which the searching user seeks in a selling entity with whom the searching user wants to do business.

In one embodiment of the invention, search results are additionally or alternatively determined based at least in part on (a) the searching user's own previous experiences with selling entities that are associated with those search results' URLs (or other attributes) and/or (b) the previous experiences, with those selling entities, of buying entities that are in the searching user's trusted buyer network. For example, in one embodiment of the invention, a search result is excluded from the set of search results that a search engine returns to a searching user, even if that search result's corresponding resource is relevant to the query terms, if one or more selling entities that are associated with that search result's URL have ever received, from the searching user, through the online business-to-business connectivity service, a rating that is lower than a specified threshold.

XXXV. Showing Teasers to Searchers who have not Declared a Need Category

In one embodiment of the invention, a searching user can declare a need category. The need category indicates a category of a need that the searching user wants some person or organization to fulfill. The searching user can select the need category from a set of specified need categories, such as "money," "people," "environment," "business (internal)," "business (external)," or "other." In one embodiment of the invention, the searching user can select the need category from among a hierarchy of need categories, in which some more specific need categories are directly subordinate to another, more general need category in the hierarchy. A searching users' need category (or categories) may be stored in the buyer attributes of the searching user's registered buying entity account.

As is discussed above in Sections XX and XXI, in one embodiment of the invention, if a searching user has not established a registered buying entity account with the online business-to-business connectivity service, then the search engine (or other mechanism) may omit one or more details about a search result (e.g., the search result's identity and/or URL), and/or one or more details of specific selling entities that are associated with a search result's URL, from data that is presented to the searching user. In place of these details, the search engine (or other searching mechanism) may supply a "teaser" that comprises text that is designed to induce the searching user to establish a registered buying entity account. The search engine may perform such operations relative to some search results and/or selling entities, but not others, based on whether those selling entities have expressed, in their seller attributes, an unwillingness to deal with searching users who have not established a registered buying entity account.

Additionally or alternatively, in one embodiment of the invention, if a searching user has not yet declared at least one need category, then the search engine (or other mechanism) similarly omits one or more details about a search result (e.g., the search result's identity and/or URL), and/or one or more details of specific selling entities that are associated with a search result's URL, from data that is presented to the searching user. In place of these details, the search engine (or other searching mechanism) may supply a "teaser" that comprises text that is designed to induce the searching user to declare a need category. For example, the search engine might display, in the place of the title and URL of a search result, text such as "Seller displays only for some need categories." The search engine might also display other non-identifying information abut the search result, such as a composite rating for selling entities that are associated with the search result's URL, and/or a composite filter score for selling entities that are associated with the search result's URL. The search engine may perform such operations relative to some search results and/or selling entities, but not others, based on whether those selling entities have expressed, in their seller attributes, an unwillingness to deal with searching users who have not declared a need category. This allows greater filtering for niche sellers who want to make sure that leads are qualified and that the seller is able to satisfy the need.

In one embodiment of the invention, a selling entity may indicate, in its seller attributes, that the selling entity does not wish to be revealed to searching users who have not declared a specified need category. In such an embodiment of the invention, the search engine (or other mechanism) omits, from data that is presented to any searching user that has not declared the specified need category, all information about that selling entity. The omission of information can be on a per-search-result basis and/or on a per-selling-entity basis. In the latter case, some selling entities that are associated with a search result's URL may be presented to the user, while other selling entities that are associated with the same search result's URL may be completely hidden from the user.

FIG. 7 is a diagram that illustrates a portion of a search results page in which a search result has been obscured due to the searching user's failure to declare at least one need category, according to an embodiment of the invention. The search results page indicates that 12 sellers were not displayed, and will not be displayed to the searching user until the searching user declares one or more need categories—need categories that may be used to determine the levels of those 12 sellers' interests in the searching user. In one embodiment of the invention, the searching user does not need to establish a registered buying entity account in order to declare a need category; in one embodiment of the invention, the searching user can declare need categories using an interface that is presented on the search results page.

As can be seen in FIG. 7, one of the search results has been deliberately obscured so that (a) the searching user cannot determine the identity of the organization that is associated with the search result and (b) the searching user cannot activate any hyperlink that would direct the searching user's Internet browser to that organization's web site. However, in connection with this "mystery" search result, the search results page shows a composite rating and a composite filter score for potentially several selling entities that are associated with that search result's URL. If the rating and/or filter score is sufficiently high, then the searching user will likely want to obtain more information about the search result, and may declare a need category in order to do so.

As is discussed above, in one embodiment of the invention, multiple selling entities may be associated with the same URL. Some selling entities that are associated with a particular URL might be willing to display seller-specific information to searching users who have not declared any need categories, while other selling entities that are associated with that particular URL might not be willing to display seller-specific information to searching users who have not declared a specific need category with which those selling entities deal. In one embodiment of the invention, for each enhanceable search result, the search results page displays, in connection with that enhanceable search result, a hyperlink whose text says "more." An example of this may be seen in FIG. 7. User activation of such a hyperlink causes the searching user's Internet browser to retrieve and display per-selling-entity information about one or more selling entities that are associated with the URL of the search result whose hyperlink was activated. An example of such per-selling-entity information is shown in FIG. 8.

Figure 8:
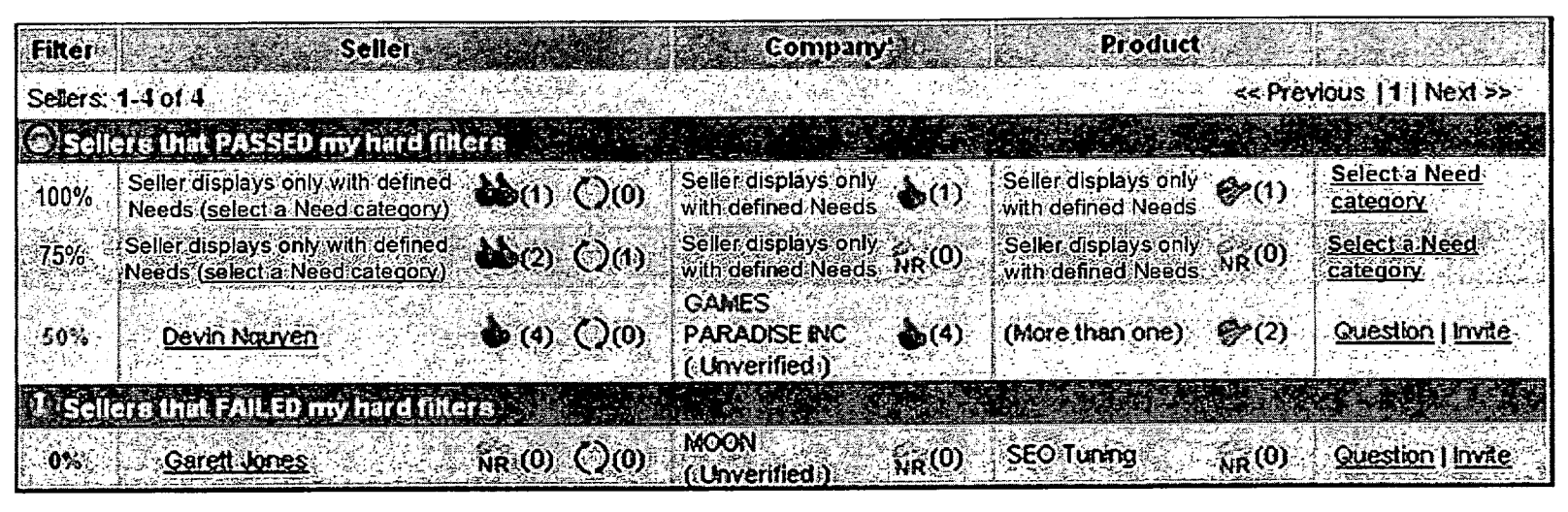

FIG. 8 is a diagram that illustrates per-selling-entity information about each of multiple selling entities that are associated with the same URL, according to an embodiment of the invention. In this example, four separate selling entities are associated with the same URL. However, two of the selling entities (the first two listed) have specified, in the seller attributes that are associated with their selling entity accounts, that they do not want certain seller-specific information to be displayed to searching users who have not declared specific need categories specified by those selling entities. These two selling entities have refused to deal with users whose needs are in categories other than those categories of needs that these two selling entities can satisfy. Therefore, while the per-selling-entity information contains seller-specific information about the last two listed selling entities, such as those entities' names, companies, and products, and includes hyperlinks by which the searching user may pose a question or submit an invitation to those entities, the per-selling-entity information omits such seller-specific information and hyperlinks relative to the first two listed selling entities. Instead of seller-specific information about the first two listed selling entities, the per-selling-entity information informs the searching user that certain aspects of the seller-specific information about those selling entities, such as those entities' names, companies, and products, is only available to users who have declared a need category. As is shown in FIG. 8, the per-selling-entity information for the first two listed selling entities may include hyperlinks that invite and enable a searching user to select a need category.

Additionally or alternatively, in one embodiment of the invention, under circumstances where multiple selling entities are associated with the same URL, entries for some of those selling entities may be omitted entirely from a per-selling-entity-based display, such as is shown in FIG. 8, if (a) some of the selling entities have specified, in their seller attributes, that information about those selling entities should be presented only to searching users that have declared at least one specific need category that has been specified by those selling entities, and (b) the searching user has not declared, as a need category of the searching user, at least one of those specific need categories. In such an embodiment of the invention, instead of displaying "teasers" for those selling entities, entries for those selling entities may be omitted from the display entirely, so that the "unqualified" searching user never even becomes aware of the existence of those selling entities. In one embodiment of the invention, a "teaser" for a particular selling entity is displayed only to searching users who have not yet declared any need category, rather than to "unqualified" searching users who have declared only need categories that are not among those in which the particular selling entity is interested.

Thus, in one embodiment of the invention, after a searching user declares a need category, one or more search results and/or selling entities, for which "teasers" were displayed prior to the searching user's declaration, may vanish from the searching user's display entirely due to the pertinent selling entities not wanting to be shown to any searching user whose declared need categories do not include any need categories that those selling entities can satisfy.

XXXVI. Example Flows

In one embodiment of the invention, one or more of the techniques described above are performed after a search engine has determined and returned relevant search results based on search query terms. For example, a toolbar application may receive such results and process them, according to the techniques described above, for presentation to a user. However, in one embodiment of the invention, one or more of the techniques described above are performed by the search engine itself as a part of determining and returning relevant search results. Embodiments of the invention are not limited to the techniques described herein strictly being performed before or strictly being performed after search results have been determined and/or returned by a search engine in a search results page.

Figure 9:
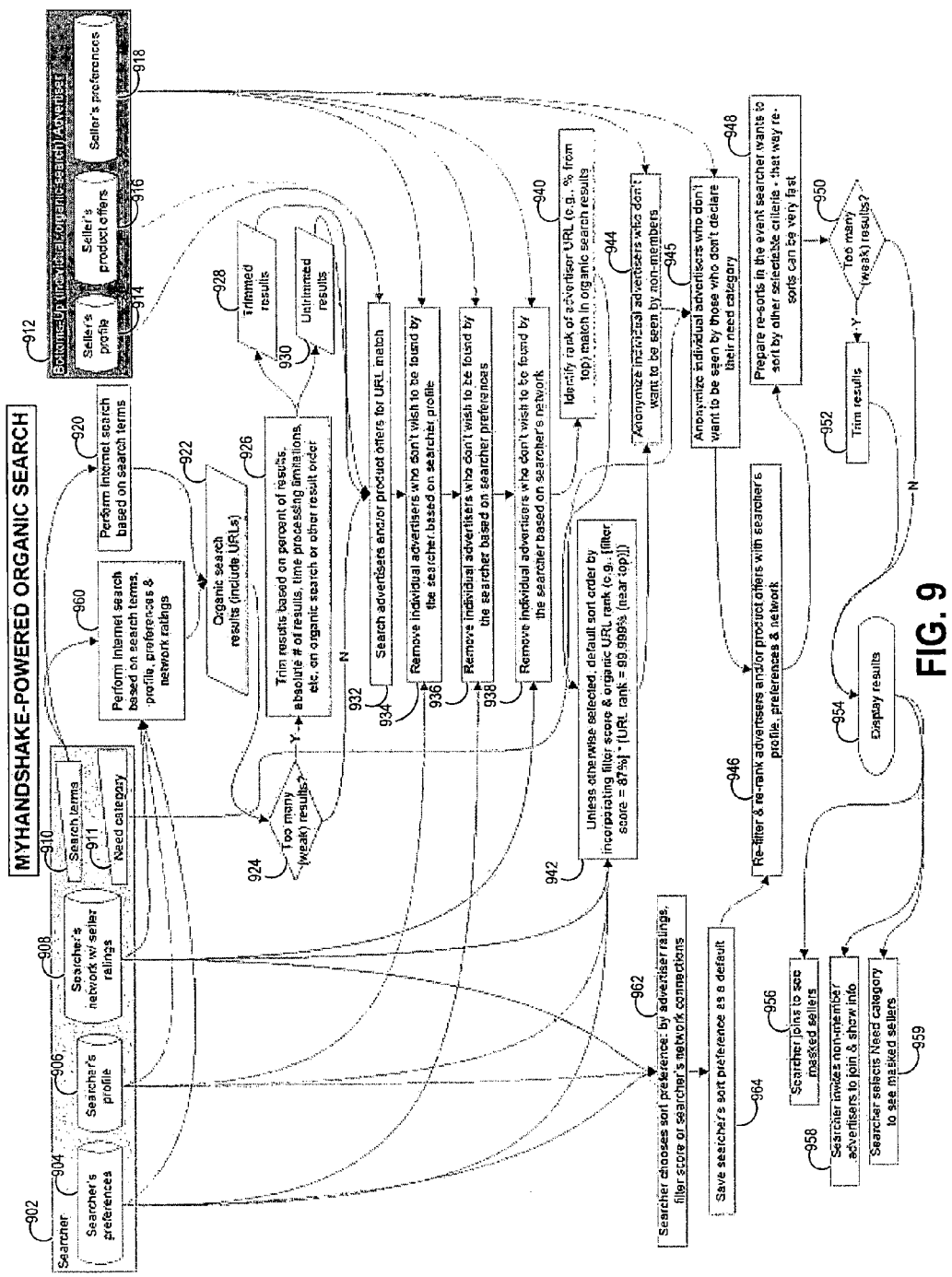
FIG. 9 is a flow diagram that illustrates various operations that may be involved in the performance of business-oriented organic search techniques, according to an embodiment of the invention.

FIG. 9 is a flow diagram that illustrates various operations that may be involved in the performance of business-oriented organic search techniques, according to an embodiment of the invention. Several elements of information may be known about a searching user (or buying entity) 902, such as the searching user's preferences 904, the searching user's profile 906, the searching user's network with seller ratings 908, search query terms 910 submitted by the searching user, and the searching user's need category 911.

Several elements of information also may be known about a bottoms-up advertiser (or selling entity) 912, such as the advertiser's seller profile 914, the advertiser's seller product offers 916, and the seller's preferences 918.

In one embodiment of the invention, searching user 902 supplies search terms 910. In step 920, an Internet search is performed based on search (query) terms 910. In step 922, the search engine returns a set of organic search results, which include URLs. In step 924, a determination is made as to whether too many weak results have been returned. If too many weak search results have been returned, then control passes to step 926. Otherwise, control passes to step 932.

In step 926, the search results are trimmed based on the percentage of results, the absolute number of results, time processing limitations, etc., on the organic search or other result order. This produces trimmed results 928. In addition to these, untrimmed results 930 optionally may be maintained. Control passes to step 932.

In step 932, advertisers and/or product offers are searched for a URL match. In step 934, individual advertisers who don't wish to be found by searching user 902 are removed from the search results based on profile 906. In step 936, individual advertisers who don't wish to be found by searching user 902 are removed from the search results based on preferences 904. In step 938, individual advertisers who don't wish to be found by searching user 902 are removed from the search results based on network and ratings 908.

In step 940 the relevance rank of each remaining advertiser's search result/URL in the organic search results is identified and associated with that search result/URL. In step 942, unless searching user 902 has selected a different sort order, the remaining advertiser's search results are sorted and ordered based on the organic relevance ranks of those search results weighted by the filter scores for the selling entities that are associated with the URLs of those search results. Alternatively, if the filter scores cannot be determined (e.g., due to the lack of filter criteria specified by searching user 902), then the weighting may be done based on the ratings of the selling entities that are associated with the search results' URLs.

In step 944, individual advertisers who don't want to be seen by non-members (i.e., searching users who don't have registered buying entity accounts) are anonymized. Teasers may be shown for these advertisers, as discussed above. In step 945, individual advertisers who don't want to be seen by searching users who haven't declared a need category are anonymized. Again, teasers may be shown for these advertisers, as discussed above. In step 946, the advertisers and/or product offers are re-filtered and re-ranked based on profile 906, preferences 904, and network and ratings 908. For example, the search results may be re-ordered based on sort criteria chosen by searching user 902. In step 948, optionally, re-sorts may be prepared "behind the scenes" (e.g., at a server) in anticipation that searching user 902 might want to sort the search results by other selectable criteria. This allows re-sorted results to be displayed very quickly after searching user 902 has selected different sort criteria.

In step 950, a determination is made as to whether there are still too many weak search results. If there are still too many weak search results, then control passes to step 952. Otherwise, control passes to step 954.

In step 952, the search results are trimmed further. Control passes to step 954.

In step 954, the remaining search results are displayed to searching user 902. In step 956, searching user 902 joins (i.e., establishes a registered buying entity account with the online business-to-business connectivity service) in order to see seller-specific information that was previously masked and anonymized in step 944. Additionally or alternatively, in step 958, searching user 902 invites non-member advertisers (i.e., advertisers who have not yet established registered selling entity accounts with the online business-to-business connectivity service) to join (i.e., establish registered selling entity accounts with the online business-to-business connectivity service) and show their seller-specific information in connection with the search results. Additionally or alternatively, in step 959, searching user 902 selects a need category in order to see seller-specific information that was previously masked and anonymized in step 945.

In one embodiment of the invention, in step 960, the search engine performs an Internet search based on search terms 910, profile 906, preferences 904, and network and ratings 908. Control then passes to step 922, already discussed above.

In one embodiment of the invention, in step 962, searching user 902 chooses a sort preference for the search results. For example, the sort preference may involve a sort by advertiser ratings, by filter score, or by the network connections indicated in network and ratings 908. In step 964, the sort preferences of searching user 902 are saved as a default. Control then passes to step 946, already discussed above.

Figure 10:
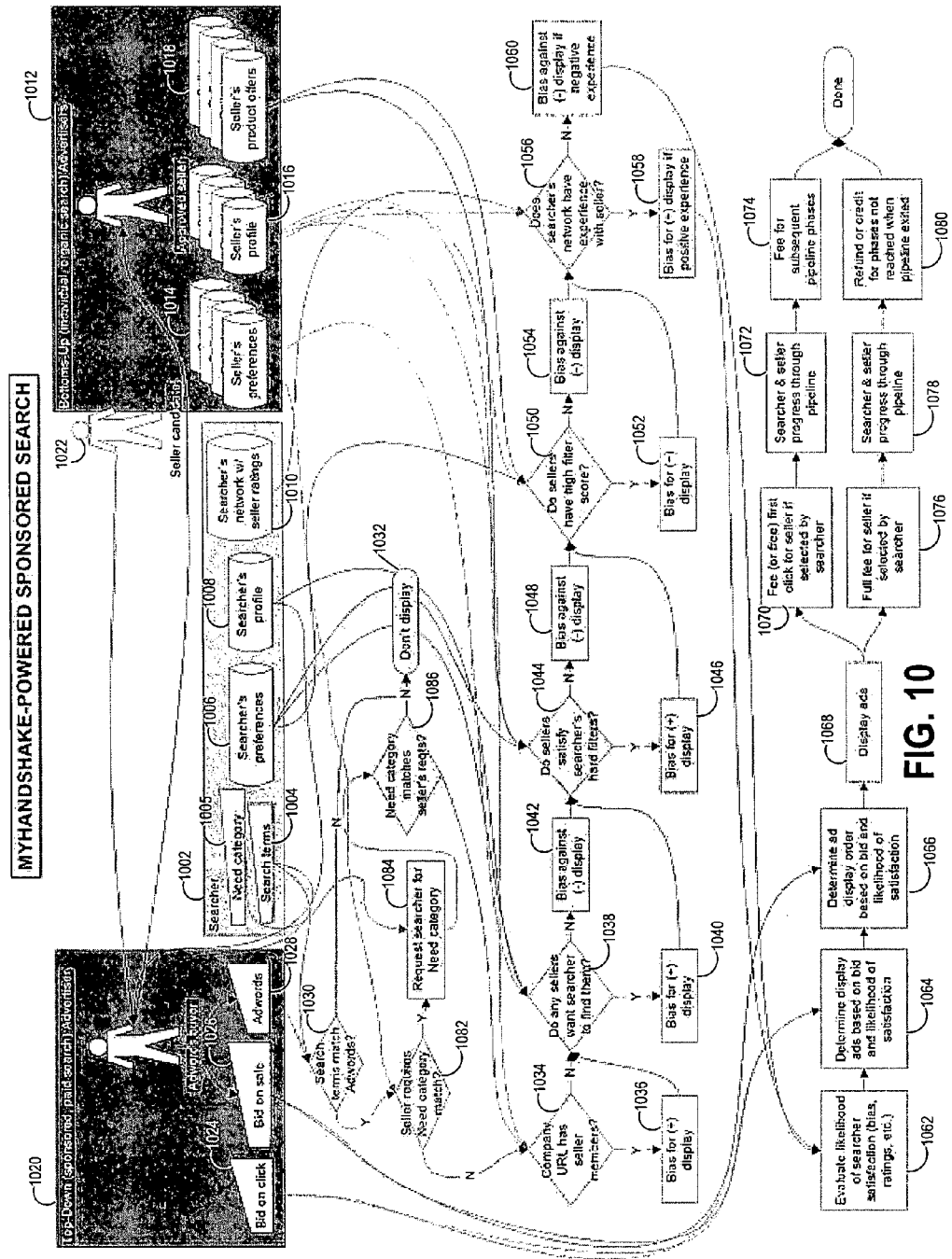
FIG. 10 is a flow diagram that illustrates various operations that may be involved in the performance of business-oriented sponsored search techniques, according to an embodiment of the invention.

FIG. 10 is a flow diagram that illustrates various operations that may be involved in the performance of business-oriented sponsored search techniques, according to an embodiment of the invention. Similar to FIG. 9, several elements of information may be known about a searching user 1002, such as search (query) terms 1004 that searching user 1002 submitted to the search engine, a need category 1005 that searching user 1002 declared, preferences 1006 of searching user 1002, a profile 1008 of searching user 1002, and a network 1010 of searching user 1002 with seller ratings.

Additionally, several elements of information may be known about each of several bottoms-up advertisers 1012. Among these are sellers' preferences 1014, sellers' profiles 1016, and sellers' product offers 1018.

Additionally, operations described herein may involve a top-down advertiser 1020. Top-down advertiser 1020 is typically the bidding entity who bids money to get a search engine to display sponsored search results and advertisements for his organization. As is discussed above, top-down advertiser 1020 has, in one embodiment of the invention, control over whether a seller candidate 1022 will be associated with URLs of sponsored search results and other advertisements for which top-down advertiser 1020 is bidding. Top-down advertiser 1020 can bid in any of several different ways. For example, top-down advertiser can bid on a click (1024) and/or on the occurrence of an actual sale or other business event (1026), as is discussed above.

In one embodiment of the invention, in step 1030, a determination is made as to whether search terms 1004 match any ad words 1028 on which top-down advertiser 1020 bid. If search terms 1004 don't match any ad words 1028, then control passes to step 1032. Otherwise, control passes to step 1082.

In step 1082, a determination is made as to whether one or more sellers that are associated with the sponsored search results or advertisement on which top-down advertiser 1020 bid require a need category match with searching user 1002. If one or more of these sellers do require a need category match, then control passes to step 1084. Otherwise, control passes to step 1034.

In step 1084, a request, for searching user 1002 to declare at least one need category, is presented to searching user 1002. Typically, searching user 1002 will declare at least one need category in response. In step 1086, a determination is made as to whether the need category declared by searching user 1002 matches any of the need categories that any of the sellers can fulfill. If so, then control passes to step 1034. If not, then control passes to step 1032.

In step 1032, advertisements of top-down advertiser 1020 are not displayed to searching user 1002 in the search results page that the search engine returns to searching user 1002.

Alternatively, in step 1034, a determination is made as to whether the URL that is associated with the company of top-down advertiser 1020 (or with the sponsored search results or advertisements for which top-down advertiser 1020 placed a bid) is associated with any seller members (i.e., registered selling entities). If the URL is associated with at least one seller member, then control passes to step 1036. Otherwise, control passes to step 1038.

In step 1036, a bias is applied in favor of displaying, to searching user 1002, on the search results page, the sponsored search result or advertisement for which top-down advertiser 1020 placed a bid. Control passes to step 1038.

In step 1038, a determination is made as to whether any of the sellers (i.e., registered selling entities) that are associated with the URL want searching user 1002 to find them. If one or more of the sellers want searching user 1002 to find them, then control passes to step 1040. Otherwise, control passes to step 1042.

In step 1040, a bias is applied in favor of displaying, to searching user 1002, on the search results page, the sponsored search result or advertisement for which top-down advertiser 1020 placed a bid. Control passes to step 1044.

Alternatively, in step 1042, optionally, a bias is applied against the displaying, to searching user 1002, on the search results page, of the sponsored search result or advertisement for which top-down advertiser 1020 placed a bid. Control passes to step 1044.

In step 1044, a determination is made as to whether the sellers associated with the URL satisfy the hard filters (discussed above) of searching user 1002. If the sellers satisfy the hard filters, then control passes to step 1046. Otherwise, control passes to step 1048.

In step 1046, a bias is applied in favor of displaying, to searching user 1002, on the search results page, the sponsored search result or advertisement for which top-down advertiser 1020 placed a bid. Control passes to step 1050.

Alternatively, in step 1048, optionally, a bias is applied against the displaying, to searching user 1002, on the search results page, of the sponsored search result or advertisement for which top-down advertiser 1020 placed a bid. Control passes to step 1050.

In step 1050, a determination is made as to whether the sellers associated with the URL have high (i.e., above a specified threshold) filter scores in view of the filter criteria specified in preferences 1006. If the sellers have high filter scores, then control passes to step 1052. Otherwise, control passes to step 1054.

In step 1052, a bias is applied in favor of displaying, to searching user 1002, on the search results page, the sponsored search result or advertisement for which top-down advertiser 1020 placed a bid. Control passes to step 1056.

Alternatively, in step 1054, optionally, a bias is applied against the displaying, to searching user 1002, on the search results page, of the sponsored search result or advertisement for which top-down advertiser 1020 placed a bid. Control passes to step 1056.

In step 1056, a determination is made as to whether any other buying entities in the network of searching user 1002, as indicated in network and ratings 1010, have had good experiences with any of the seller associated with the URL. If the experiences have been good overall, then control passes to step 1058. If the experiences have been negative overall, then control passes to step 1060.

In step 1058, a bias is applied in favor of displaying, to searching user 1002, on the search results page, the sponsored search result or advertisement for which top-down advertiser 1020 placed a bid. Control passes to step 1062.

Alternatively, in step 1060, optionally, a bias is applied against the displaying, to searching user 1002, on the search results page, of the sponsored search result or advertisement for which top-down advertiser 1020 placed a bid. Control passes to step 1062.

In step 1062, the likelihood that searching user 1002 is going to be satisfied by the organization of top-down advertiser 1020 is evaluated based on the previously computer bias and other factors, such as ratings. In step 1064, a set of sponsored search results and/or advertisements which should be displayed to searching user 1002 on a search results page is determined based on the bid submitted by top-down advertiser 1020 and the likelihood of the searching user's satisfaction, as evaluated in step 1062. The sponsored search result or advertisement of top-down advertiser 1020 might or might not be selected. In step 1066, the order in which the selected sponsored search results and/or advertisements should be displayed on the search results page is determined based at least in part on the bids submitted for those results and advertisements, and at least in part on the likelihoods of searching user satisfaction evaluated for each of those results and advertisements.

In step 1068, the selected sponsored search results and/or advertisements determined in step 1064 are displayed, on the search results page, to searching user 1002, in the order determined in step 1066.

In one embodiment of the invention, control passes from step 1068 to step 1070. In such an embodiment of the invention, in step 1070, the search engine's owner may charge, to top-down advertiser 1020, a fee corresponding to the bid for a click (1024) as a consequence of the selection of the advertiser's sponsored search result/advertisement by searching user 1002. Alternatively, the fee may be waived. In one embodiment of the invention, the fee is waived if at least one registered selling entity is associated with the URL (or other attribute) of the sponsored search result/advertisement. In step 1072, searching user 1002 and a selected one of bottoms-up advertisers 1012 progress through the stages of the multi-stage pipeline discussed above. In step 1074, the search engine's owner may charge, to top-down advertiser 1020, additional fees that correspond to the stages of the pipeline to which the searching user and the selected advertiser elected to progress, mutually.

Alternatively, in one embodiment of the invention, control passes from step 1068 to step 1076. In such an embodiment of the invention, the search engine's owner may charge, to top-down advertiser 1020, a fee corresponding to a bid for a full sale (1026) as a consequence of the selection of the advertiser's sponsored search result/advertisement by searching user 1002. In step 1078, searching user 1002 and a selected one of bottoms-up advertisers 1012 progress through the stages of the multi-stage pipeline discussed above. In step 1080, the search engine's owner may refund or credit, to top-down advertiser 1020, portions of the already-charged fee that correspond to the stages of the pipeline to which the searching user and the selected advertiser did not elect to progress, mutually, at the time that one or the other elected to exit to the pipeline.

XXXVII. Implementation Mechanisms, Alternatives & Extensions

Figure 3:
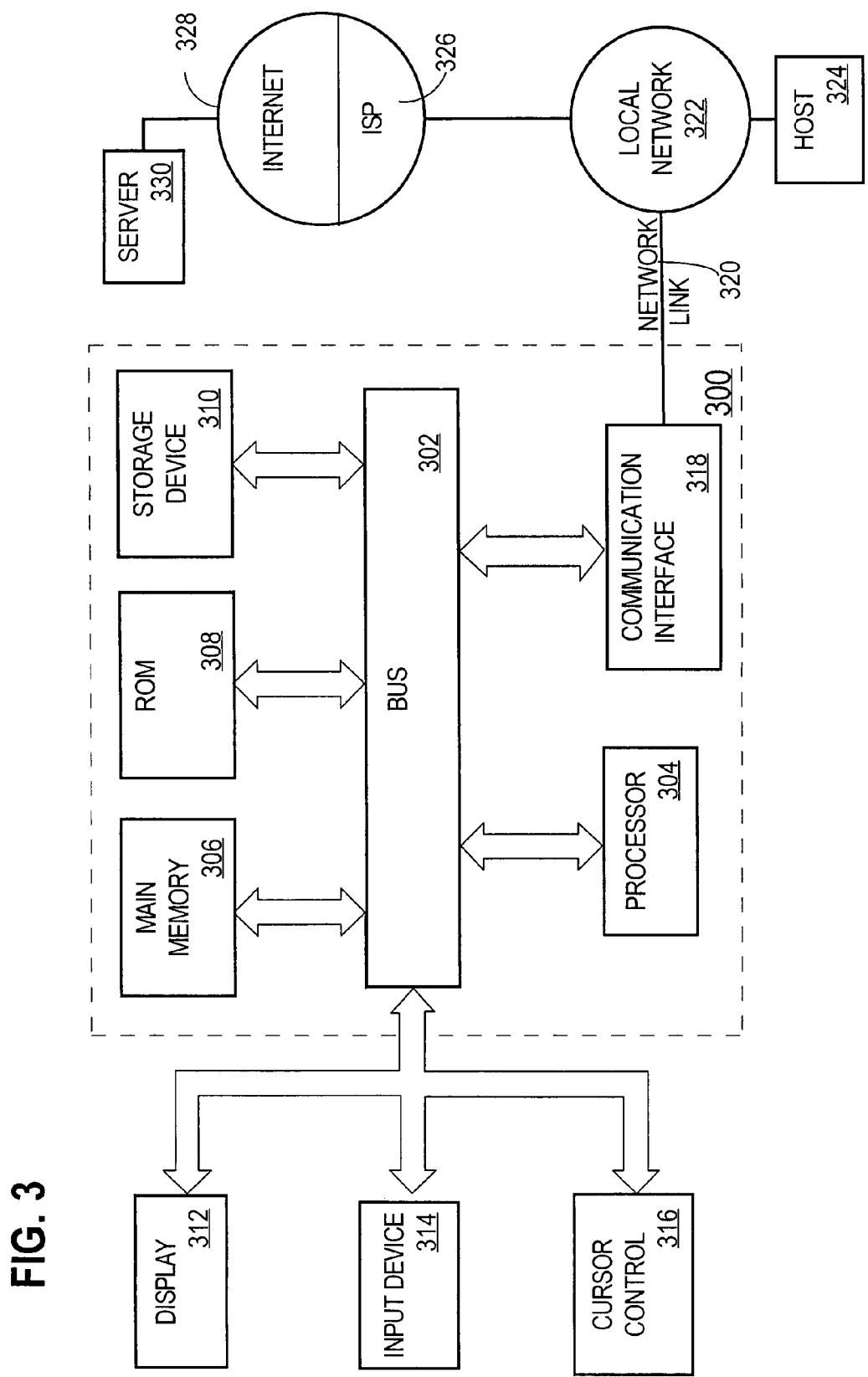
FIG. 3 is a block diagram that illustrates a computer system upon which an embodiment of the invention may be implemented.

The approach described herein for business-oriented search is applicable to a variety of contexts and implementations and is not limited to a particular context or implementation. FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for facilitating business-to-business personal connections by enhancing Internet search results, the method comprising the machine-implemented steps of:

registering one or more selling entities by establishing a selling entity account for each of the one or more selling entities in a business-to-business connectivity service, wherein each of the one or more selling entities corresponds to a single individual associated with one or more companies and wherein each individual is associated with only one selling entity;

registering one or more buying entities by establishing a buying entity account for each of the one or more buying entities in a business-to-business connectivity service, wherein each of the one or more buying entities corresponds to a single individual;

receiving one or more search query terms from a searching user;

determining, based on the one or more search query terms, a first set of search results generated by an Internet search engine that queries the World Wide Web, that are relevant relative to the search query terms;

selecting, from the first set, a second set of one or more search results, wherein each search result in the second set is selected in response to a determination that it comprises a Uniform Resource Locator (URL) that has been previously registered in association with at least one selling entity account in the business-to-business connectivity service;

ranking the one or more search results in the second set based on at least one of:

one or more ratings that are based on input from one or more buying entities or, a filter score that is based on filter criteria specified by a submitter of the search query terms when the submitter of the search query terms is a buying entity;

generating, for presentation, seller-specific information for each of the search results that are in the second set of search results, wherein seller-specific information comprises the name of a selling entity, the company associated with each selling entity, and one or both of a product or service that each selling entity is associated with; and presenting seller-specific information in connection with only those search results for which seller-specific information was generated.

2. The method of claim 1, wherein each result in the second set has been ranked, based at least in part on relevance relative to the search query terms, among a specified top percentage of search results that are in the first set.

3. The method of claim 1, wherein each result in the second set has been ranked, based at least in part on relevance relative to the search query terms, among a specified top number of search results that are in the first set.

4. The method of claim 1, wherein the step of selecting the second set further comprises:

selecting, from the first set, a particular search result that contains a Uniform Resource Locator (URL), at least a portion of which is associated with at least one particular registered selling entity that possesses a particular rating that is no less than a specified threshold;

wherein the particular rating is based on input from one or more buying entities that have interacted with the particular registered selling entity.

5. The method of claim 1, wherein the step of selecting the second set further comprises:
   selecting, from the first set, a particular search result that contains a Uniform Resource Locator (URL), at least a portion of which is associated with at least one particular registered selling entity that possesses a particular filter score that is no less than a specified threshold;
   wherein the particular filter score is based on an extent to which attributes of the particular registered selling entity satisfy the filter criteria.

6. The method of claim 1, wherein the step of selecting the second set further comprises:
   determining a maximum quantity of search results for which seller-specific information can be generated within a specified period of time;
   selecting, from the first set, no more than the maximum quantity of search results for inclusion in the second set.

7. The method of claim 1, wherein the searching user is a buying entity and determining the first set of search results is further determined based one at least one of or a combination of the following:
   a set of attributes submitted by the searching user, which describe the searching user's capacity as a buyer;
   a set of filter criteria submitted by the searching user which indicate characteristics of selling entities that describe a selling entity's capacity as a seller; or
   at least one previous experience of the searching user with one or more selling entities and at least one previous experience of one or more other buying entities in a trusted buyer network associated with the searching user.

8. The method of claim 1, wherein determining the first set of search results further comprises:
   for each search result, determining a relevance ranking based on relevance of the result to the one or more search query terms;
   determining a presentation order for each search result that is based at least in part on a metric that is associated with one or more selling entities and wherein the metric is weighted based on the relevance ranking;
   wherein the metric comprises at least one of:
      a filter score based on filter criteria specified by the searching user when the searching user is a buying entity;
      a rating based on input from one or more buying entities that have interacted with the one or more selling entities; or
      a trusted buyer network score based on input from one or more buying entities who are trusted by the searching user.

9. A system for facilitating business-to-business personal connections by enhancing Internet search results, the system comprising:
   a processor;
   a memory coupled to the processor, the memory having stored thereon computer executable instructions executable by the system to perform operations, comprising:
   registering one or more selling entities by establishing a selling entity account for each of the one or more selling entities in a business-to-business connectivity service, wherein each of the one or more selling entities corresponds to a single individual associated with one or more companies and wherein each individual is associated with only one selling entity;
   registering one or more buying entities by establishing a buying entity account for each of the one or more buying entities in a business-to-business connectivity service, wherein each of the one or more buying entities corresponds to a single individual;
   receiving one or more search query terms from a searching user;
   determining, based on the one or more search query terms, a first set of one or more search results generated by an Internet search engine that queries the World Wide Web, that are relevant relative to the search query terms;
   selecting, from the first set, a second set of one or more search results, wherein each search result in the second set is selected in response to a determination that it comprises a Uniform Resource Locator (URL) that has been previously registered in association with at least one selling entity account in the business-to-business connectivity service;
   ranking the one or more search results in the second set based on at least one of: one or more ratings that are based on input from one or more buying entities or, a filter score that is based on filter criteria specified by a submitter of the search query terms when the submitter of the search query terms is a buying entity;
   generating, for presentation, seller-specific information for each of the search results that are in the second set of search results, wherein seller-specific information comprises the name of a selling entity, the company associated with each selling entity, and one or both of a product or service that each selling entity is associated with;
   presenting seller-specific information in connection with only those search results for which seller-specific information was generated.

10. The system of claim 9, wherein the searching user is a buying entity and determining the first set of search results is further determined based one at least one of or a combination of the following:
   a set of attributes submitted by the searching user, which describe the searching user's capacity as a buyer;
   a set of filter criteria submitted by the searching user which indicate characteristics of selling entities that describe a selling entity's capacity as a seller; or
   at least one previous experience of the searching user with one or more selling entities and at least one previous experience of one or more other buying entities in a trusted buyer network associated with the searching user.

11. The system of claim 9, wherein the step of presenting seller-specific information further comprises:
   presenting seller-specific information for selling entities that have a filter score that is at least as great as a specified threshold without presenting any seller-specific information selling entities that have a filter score that is less than the specified threshold.

12. A method for facilitating business-to-business personal connections by enhancing Internet search results, a method comprising the machine-implemented steps of:
   registering one or more selling entities by establishing a selling entity account for each of the one or more selling entities in a business-to-business connectivity service, wherein each of the one or more selling entities corresponds to a single individual associated with one or more companies and wherein each individual is associated with only one selling entity;
   registering one or more buying entities by establishing a buying entity account for each of the one or more buying entities in a business-to-business connectivity service, wherein each of the one or more buying entities corresponds to a single individual;
receiving one or more search query terms from a buying entity;
determining, based on the one the one or more search query terms, a first set of search results generated by an Internet search engine that queries the World Wide Web;
selecting, from the first set, a second set of one or more search results, wherein each search result in the second set is selected in response to a determination that it comprises a Uniform Resource Locator (URL) that has been previously registered in association with at least one selling entity account in the business-to-business connectivity service;
for each selling entity of the one or more selling entities associated with the one or more search results in the second set, determining, for each selling entity, a trusted buyer network indicator that is based at least in part on one or more ratings that were assigned to the selling entity by one or more additional buying entities that were selected for inclusion within a trusted buyer network by the buying entity that provided the search query terms; and
in a search results page, in connection with each search result of the second set, for each selling entity of the one or more selling entities, presenting seller-specific information about that selling entity only if the trusted buyer network indicator for that selling entity meets a specified threshold, wherein the seller-specific information comprises the name of the selling entity, the company associated with the selling entity, and one or both of a product or service that the selling entity is associated with.

13. A system for facilitating business-to-business personal connections by enhancing Internet search results, the system comprising:
a processor;
a memory coupled to the processor, the memory having stored thereon computer executable instructions executable by the system to perform operations, comprising:
registering one or more selling entities by establishing a selling entity account for each of the one or more selling entities in a business-to-business connectivity service, wherein each of the one or more selling entities corresponds to a single individual associated with one or more companies and wherein each individual is associated with only one selling entity;
registering one or more buying entities by establishing a buying entity account for each of the one or more buying entities in a business-to-business connectivity service, wherein each of the one or more buying entities corresponds to a single individual;
receiving one or more search query terms from a buying entity;
determining, based on the one the one or more search query terms, a first set of search results generated by an Internet search engine that queries the World Wide Web;
selecting, from the first set, a second set of one or more search results, wherein each search result in the second set is selected in response to a determination that it comprises a Uniform Resource Locator (URL) that has been previously registered in association with at least one selling entity account in the business-to-business connectivity service;
for each selling entity of the one or more selling entities associated with the one or more search results in the second set, determining, for each selling entity, a trusted buyer network indicator that is based at least in part on one or more ratings that were assigned to the selling entity by one or more additional buying entities that were selected for inclusion within a trusted buyer network by the buying entity that provided the search query terms; and
in a search results page, in connection with each search result of the second set, for each selling entity of the one or more selling entities, presenting seller-specific information about that selling entity only if the trusted buyer network indicator for that selling entity meets a specified threshold, wherein the seller-specific information comprises the name of the selling entity, the company associated with the selling entity, and one or both of a product or service that the selling entity is associated with.

14. A non-transitory computer readable storage medium for facilitating business-to-business personal connections by enhancing Internet search results, the non-transitory computer readable storage medium storing instructions that when executed by a processor cause a computing device to perform acts comprising:
registering one or more selling entities by establishing a selling entity account for each of the one or more selling entities in a business-to-business connectivity service, wherein each of the one or more selling entities corresponds to a single individual associated with one or more companies and wherein each individual is associated with only one selling entity;
registering one or more buying entities by establishing a buying entity account for each of the one or more buying entities in a business-to-business connectivity service, wherein each of the one or more buying entities corresponds to a single individual;
receiving one or more search query terms from a searching user;
determining, based on the one or more search query terms, a first set of search results generated by an Internet search engine that queries the World Wide Web, that are relevant relative to the search query terms;
selecting, from the first set, a second set of one or more search results, wherein each search result in the second set is selected in response to a determination that it comprises a Uniform Resource Locator (URL) that has been previously registered in association with at least one selling entity account in the business-to-business connectivity service;
ranking the one or more search results in the second set based on at least one of: one or more ratings that are based on input from one or more buying entities or, a filter score that is based on filter criteria specified by a submitter of the search query terms when the submitter of the search query terms is a buying entity;
generating, for presentation, seller-specific information for each of the search results that are in the second set of search results, wherein seller specific information comprises the name of a selling entity, the company associated with each selling entity, and one or both of a product or service that each selling entity is associated with; and
presenting seller-specific information in connection with only those search results for which seller-specific information was generated.

15. The non-transitory computer readable medium of claim 14, wherein the searching user is a buying entity and determining the first set of search results is further determined based one at least one of or a combination of the following:
a set of attributes submitted by the searching user, which describe the searching user's capacity as a buyer;

a set of filter criteria submitted by the searching user which indicate characteristics of selling entities that describe a selling entity's capacity as a seller; or at least one previous experience of the searching user with one or more selling entities and at least one previous experience of one or more other buying entities in a trusted buyer network associated with the searching user.

16. A non-transitory computer readable storage medium for facilitating business-to-business personal connections by enhancing Internet search results, the non-transitory computer readable storage medium storing instructions that when executed by a processor cause a computing device to perform acts comprising: registering one or more selling entities by establishing a selling entity account for each of the one or more selling entities in a business-to-business connectivity service, wherein each of the one or more selling entities corresponds to a single individual associated with one or more companies and wherein each individual is associated with only one selling entity;

registering one or more buying entities by establishing a buying entity account for each of the one or more buying entities in a business-to-business connectivity service, wherein each of the one or more buying entities corresponds to a single individual;

receiving one or more search query terms from a buying entity;

determining, based on the one the one or more search query terms, a first set of search results generated by an Internet search engine that queries the World Wide Web, based at least in part on the one or more search query terms;

selecting, from the first set, a second set of one or more search results, wherein each search result in the second set is selected in response to a determination that it comprises a Uniform Resource Locator (URL) that has been previously registered in association with at least one selling entity account in the business-to-business connectivity service;

for each selling entity of the one or more selling entities associated with the one or more search results in the second set, determining, for each selling entity, a trusted buyer network indicator that is based at least in part on one or more ratings that were assigned to the selling entity by one or more additional buying entities that were selected for inclusion within a trusted buyer network by the buying entity that provided the search query terms; and in a search results page, in connection with each search result of the second set, for each selling entity of the one or more selling entities, presenting seller-specific information about that selling entity only if the trusted buyer network indicator for that selling entity meets a specified threshold, wherein the seller-specific information comprises the name of the selling entity, the company associated with the selling entity, and one or both of a product or service that the selling entity is associated with.

17. A method for facilitating business-to-business personal connections by enhancing Internet search results, a method comprising the machine-implemented steps of:

registering one or more selling entities by establishing a selling entity account for each of the one or more selling entities in a business-to-business connectivity service, wherein each of the one or more selling entities corresponds to a single individual associated with one or more companies and wherein each individual is associated with only one selling entity;

registering one or more buying entities by establishing a buying entity account for each of the one or more buying entities in a business-to-business connectivity service, wherein each of the one or more buying entities corresponds to a single individual;

receiving one or more search query terms from a buying entity;

determining, based on the one or more search query terms, a first set of search results generated by an Internet search engine that queries the World Wide Web, that are relevant relative to the search query terms;

selecting, from the first set, a second set of one or more search results, wherein each search result in the second set is selected in response to a determination that it comprises a Uniform Resource Locator (URL) that has been previously registered in association with at least one selling entity account in the business-to-business connectivity service;

applying a filtering mechanism to the second set of one or more search results, wherein applying the filtering mechanism comprises:

receiving filtering criteria from the buying entity that initiated the search, wherein the filtering criteria comprises rating information provided by one or more buying entities registered in the business-to business connectivity service, and a number of ongoing relationships between buying entities and the selling entities associated with the second set of one or more search results; and generating a filter score for each of the one or more search results in the second set based on the received filtering criteria;

presenting seller-specific information for each search result in the second set of search results that has a filter score exceeding a threshold, wherein the seller specific information comprises the name of a selling entity, the company associated with each selling entity, and one or both of a product or service that each selling entity is associated with.

18. A method for facilitating business-to-business personal connections by enhancing Internet search results, a method comprising the machine-implemented steps of:

registering one or more selling entities by establishing a selling entity account for each of the one or more selling entities in a business-to-business connectivity service, wherein each of the one or more selling entities corresponds to a single individual associated with one or more companies and wherein each individual is associated with only one selling entity;

registering one or more buying entities by establishing a buying entity account for each of the one or more buying entities in a business-to-business connectivity service, wherein each of the one or more buying entities corresponds to a single individual;

receiving one or more search query terms from a searching user;

determining, based at least in part on the one or more search query terms, a first set of search results generated by an Internet search engine that queries the World Wide Web wherein the first set of search results are ranked based on relevance;

selecting, from the first set, a second set of one or more search results, wherein each search result in the second set is selected in response to a determination that it comprises a Uniform Resource Locator (URL) that has been previously registered in association with at least one selling entity account in the business-to-business connectivity service;

ranking the one or more search results in the second set based on at least one of: one or more ratings that are based on input from one or more buying entities or, a filter score that is based on filter criteria specified by a submitter of the search query terms when the submitter of the search query terms is a buying entity;

generating a split search results page, wherein on one side of the split, the search results page contains ranked search results from the first set, and wherein on another side of the split, the search results page contains ranked search results from the second set;

presenting seller-specific information for each of the search results that are in the second set of search results, wherein seller specific information comprises the name of a selling entity, the company associated with each selling entity, and one or both of a product or service that each selling entity is associated with.

19. The method of claim 18, wherein generating the split search result page comprises listing, for each of one or more search results in the second set, an indicator that indicates a relevance ranking for that search result.

20. The method of claim 18, wherein the searching user is a buying entity and determining the first set of search results is further determined based one at least one of or a combination of the following:

a set of attributes submitted by the searching user, which describe the searching user's capacity as a buyer;

a set of filter criteria submitted by the searching user which indicate characteristics of selling entities that describe a selling entity's capacity as a seller; or at least one previous experience of the searching user with one or more selling entities and at least one previous experience of one or more other buying entities in a trusted buyer network associated with the searching user.

* * * * *